(12) United States Patent
Andou et al.

(10) Patent No.: US 10,893,489 B2
(45) Date of Patent: Jan. 12, 2021

(54) USER DEVICE, BASE STATION, COMMUNICATION METHOD, AND INSTRUCTION METHOD

(71) Applicant: NTT DOCOMO, INC., Tokyo (JP)

(72) Inventors: Kei Andou, Tokyo (JP); Kazuki Takeda, Tokyo (JP); Tooru Uchino, Tokyo (JP); Kunihiko Teshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/578,398

(22) PCT Filed: Apr. 6, 2016

(86) PCT No.: PCT/JP2016/061319
§ 371 (c)(1),
(2) Date: Nov. 30, 2017

(87) PCT Pub. No.: WO2017/033490
PCT Pub. Date: Mar. 2, 2017

(65) Prior Publication Data
US 2018/0213489 A1 Jul. 26, 2018

(30) Foreign Application Priority Data

Aug. 21, 2015 (JP) ................. 2015-164257

(51) Int. Cl.
*H04W 52/36* (2009.01)
*H04W 72/04* (2009.01)
(Continued)

(52) U.S. Cl.
CPC ......... *H04W 52/367* (2013.01); *H04W 16/32* (2013.01); *H04W 52/146* (2013.01);
(Continued)

(58) Field of Classification Search
CPC ............ H04W 52/367; H04W 52/146; H04W 72/0446; H04W 16/32; H04W 72/04; H04W 52/38; H04W 52/346
See application file for complete search history.

(56) References Cited

U.S. PATENT DOCUMENTS

2013/0010720 A1* 1/2013 Lohr ............... H04L 5/0098
370/329
2016/0255594 A1* 9/2016 Vajapeyam ......... H04W 52/346
455/522
(Continued)

FOREIGN PATENT DOCUMENTS

WO WO2012056273 A1 * 5/2012
WO 2015/116866 A1 8/2015

OTHER PUBLICATIONS

Extended European Search Report issued in counterpart European Patent Application No. 16838837.9, dated Mar. 13, 2019 (9 Pages).
(Continued)

*Primary Examiner* — Shailendra Kumar
(74) *Attorney, Agent, or Firm* — Osha Bergman Watanabe & Burton LLP

(57) ABSTRACT

A user device for a radio communication system supports uplink carrier aggregation. The user device includes a transmitter that transmits an uplink signal to a base station by using a first component carrier and a second component carrier having a TTI length shorter than a TTI length of the first component carrier, and a calculator that calculates a lower limit and an upper limit of a maximum transmission power of the uplink signal according to predetermined formulas using one of a subframe of the first component carrier and a subframe of the second component carrier as a reference subframe.

6 Claims, 15 Drawing Sheets

(51) Int. Cl.
H04W 16/32 (2009.01)
H04W 52/38 (2009.01)
H04W 52/14 (2009.01)
H04W 52/34 (2009.01)

(52) U.S. Cl.
CPC .......... *H04W 52/38* (2013.01); *H04W 72/04* (2013.01); *H04W 72/0446* (2013.01); *H04W 52/346* (2013.01)

(56) References Cited

U.S. PATENT DOCUMENTS

2017/0325164 A1* 11/2017 Lee .................... H04W 72/042
2018/0014255 A1* 1/2018 Pelletier ............ H04W 72/0473

OTHER PUBLICATIONS

International Search Report issued in PCT/JP2016/061319 dated Jun. 14, 2016 (3 pages).
Written Opinion of the International Searching Authority issued in PCT/JP2016/061319 dated Jun. 14, 2016 (3 pages).
3GPP TS 36.213 V12.6.0; "3rd Generation Partnership Project; Technical Specification Group Radio Access Network; Evolved Universal Terrestrial Radio Access (E-UTRA); Physical layer procedures (Release 12)"; Jun. 2015 (241 pages).
3GPP TS 36.101 V13.0.0; "3rd Generation Partnership Project; Technical Specification Group Radio Access Network; Evolved Universal Terrestrial Radio Access (E-UTRA); User Equipment (UE) radio transmission and reception (Release 13)"; Jul. 2015 (699 pages).

* cited by examiner

FIG.2
(a)
MCG LEAD
$P_{CMAX\_L} = MIN\{P_{CMAX\_L}(p,q), P_{CMAX\_L}(p,q-1)\}$
$P_{CMAX\_H} = MAX\{P_{CMAX\_H}(p,q), P_{CMAX\_H}(p,q-1)\}$
REFERENCE SUBFRAME
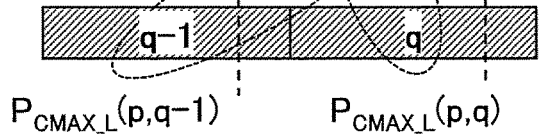
(b)
SCG LEAD
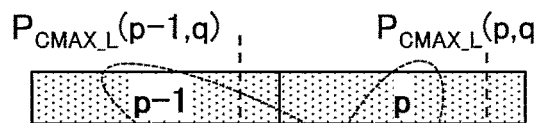
REFERENCE SUBFRAME
$P_{CMAX\_L} = MIN\{P_{CMAX\_L}(p-1,q), P_{CMAX\_L}(p,q)\}$
$P_{CMAX\_H} = MAX\{P_{CMAX\_H}(p-1,q), P_{CMAX\_H}(p,q)\}$

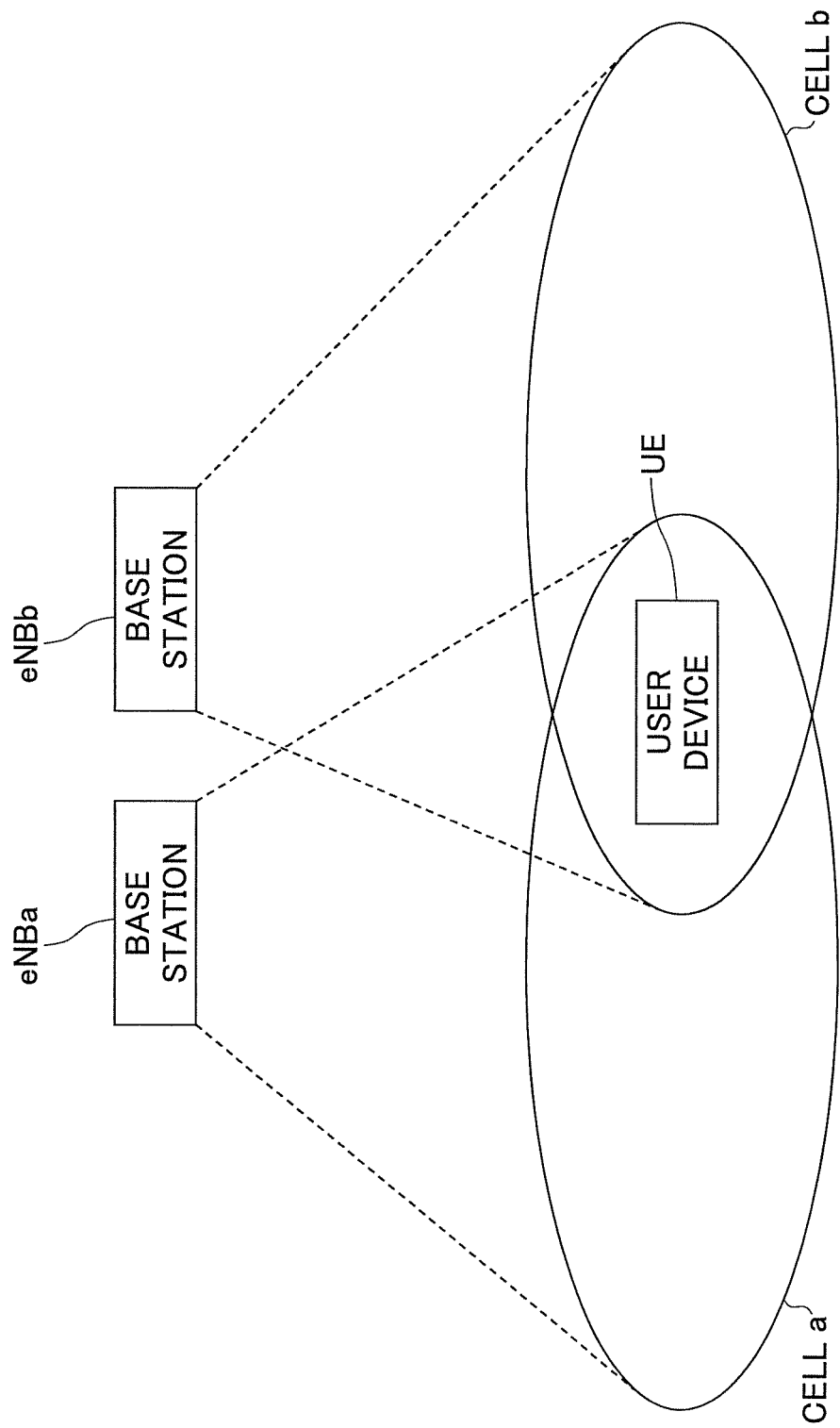

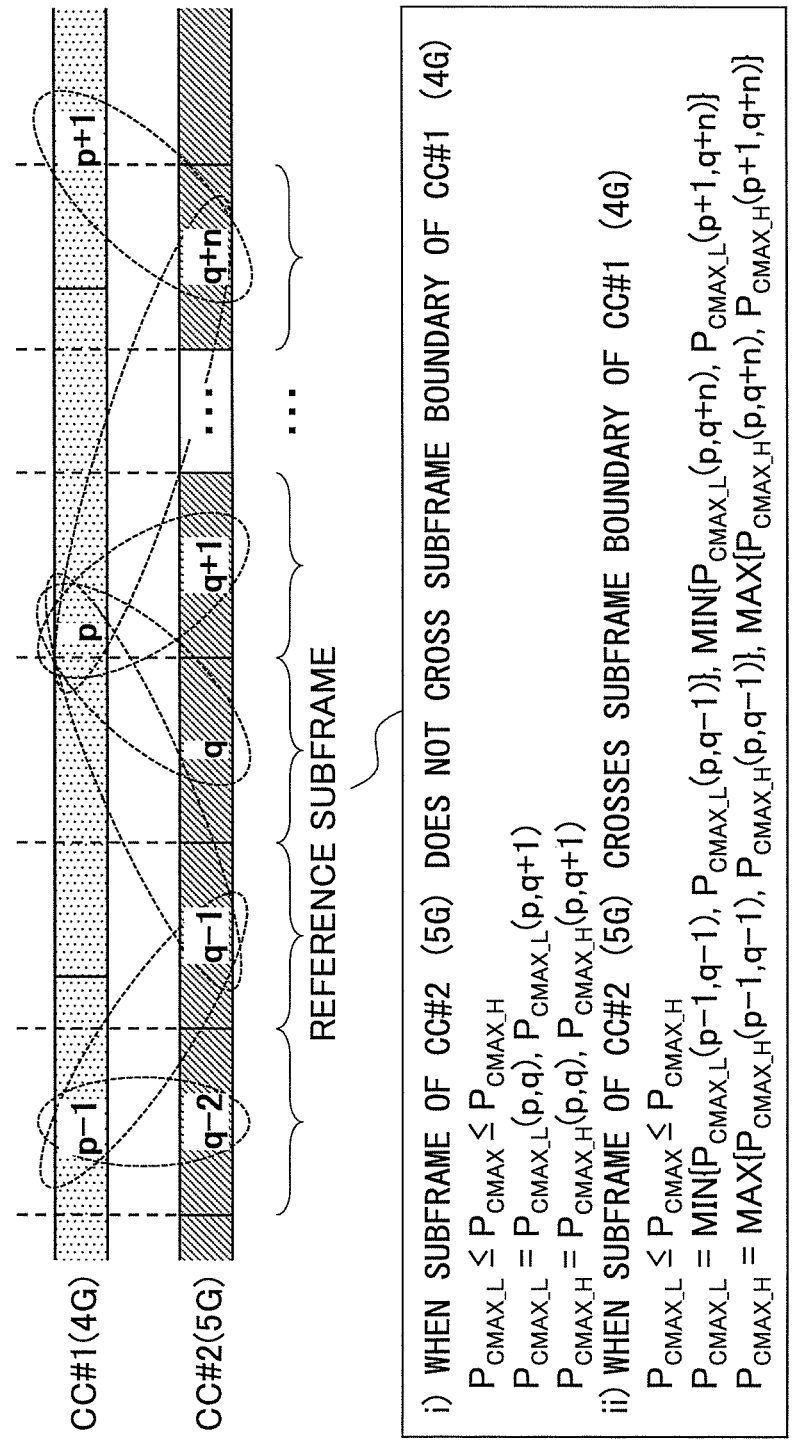

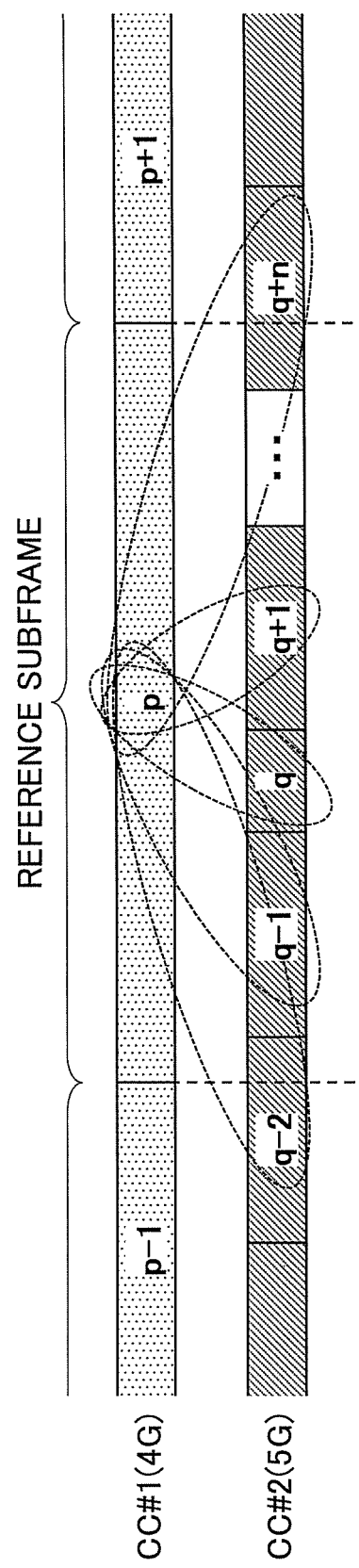

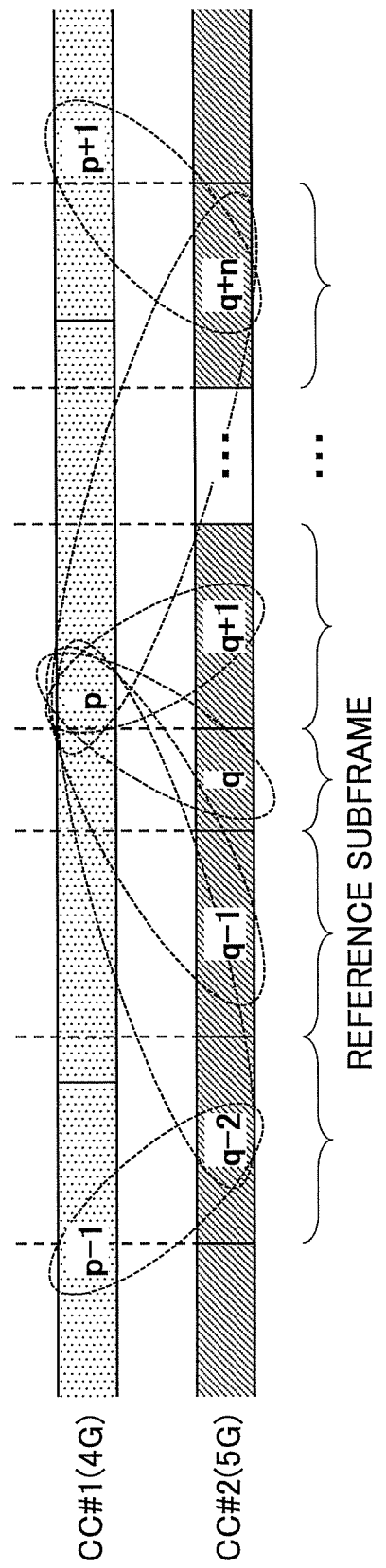

FIG.6
(a)
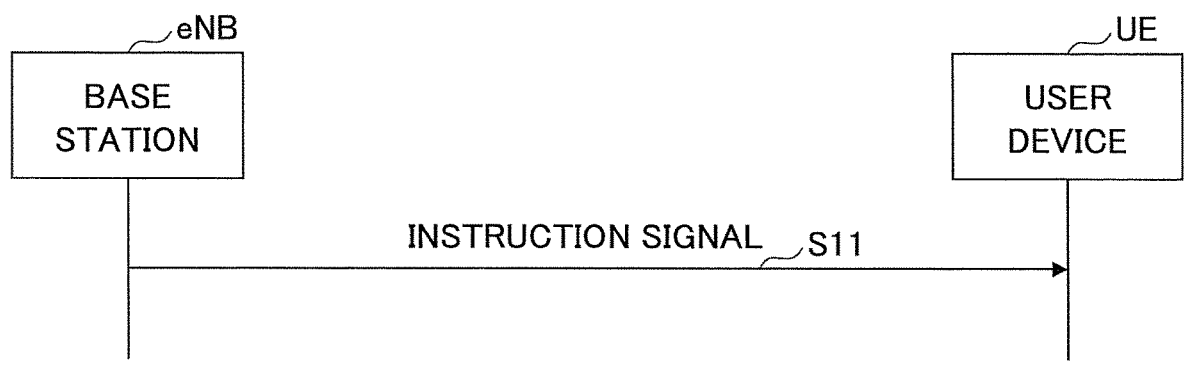
(b)
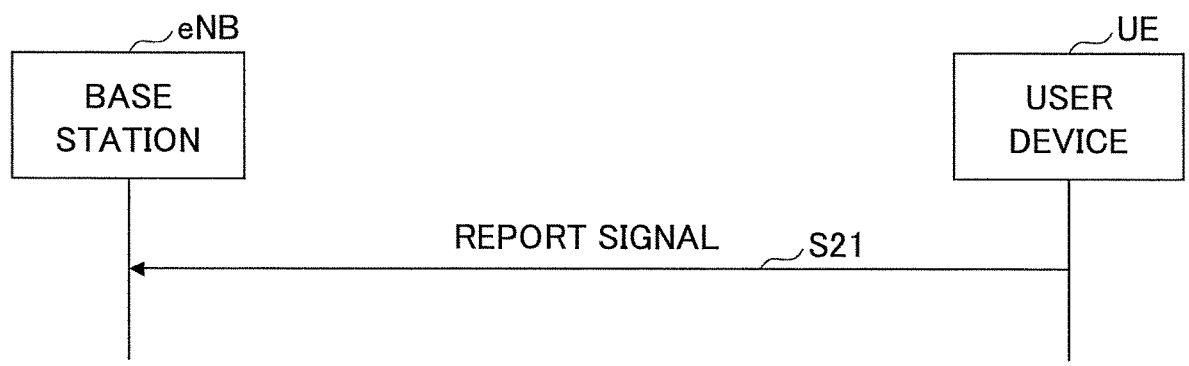

USER DEVICE, BASE STATION, COMMUNICATION METHOD, AND INSTRUCTION METHOD

TECHNICAL FIELD

The present invention relates to a user device, a base station, a communication method, and an instruction method.

BACKGROUND ART

A Long Term Evolution (LTE) system employs carrier aggregation (CA) where communications are performed using multiple carriers at the same time and using a predetermined bandwidth (maximum of 20 MHz) as a base unit. A carrier used as a base unit in the carrier aggregation is referred to as a component carrier (CC).

When CA is performed, a primary cell (PCell) and a secondary cell (SCell) are set for a user device. The PCell is a highly-reliable cell and secures connectivity, and the SCell is a subsidiary cell. The user device primarily connects to the PCell and can add the SCell as necessary. The PCell is substantially the same as an independent cell that supports radio link monitoring (RLM) and semi-persistent scheduling (SPS).

The SCell is a cell that is set for the user device in addition to the PCell. Addition and removal of the SCell is performed by radio resource control (RRC) signaling. Immediately after the SCell is set for the user device, the SCell is in a deactivated state and becomes able to perform communications (able to perform scheduling) only after being activated. In CA of LTE Rel-10, multiple CCs under the same base station are used.

On the other hand, Rel-12 defines "dual connectivity" (DC) that performs simultaneous communication using CCs under different base stations to achieve high throughput. That is, in the dual connectivity, the user device performs communications using radio resources of two physically-separate base stations at the same time.

The dual connectivity is a type of CA, which may also be referred to as "inter-eNB CA", and uses a master eNB (MeNB) and a secondary eNB (SeNB). Here, CA performed using the same base station is referred to as "intra-eNB CA" to distinguish it from "inter-eNB CA".

In DC, a cell group composed of one or more cells under the MeNB is referred to as a master cell group (MCG), and a cell group composed of one or more cells under the SeNB is referred to as a secondary cell group (SCG). Uplink CCs are set in at least one SCell in the SCG, and PUCCH is set in one of the uplink CCs. This SCell is referred to as a primary SCell (PSCell).

In LTE, to enable reception of an uplink signal with a proper power level, the base station controls the transmission power of the user device (transmission power control (TPC)). More specifically, the user device determines the transmission power based on, for example, maximum transmission power (PcmA) with which the user device can transmit an uplink signal, an estimated value of path loss (PL) of a downlink signal, a signal transmission bandwidth, and a power control command (TPC command) from the base station (Non-Patent Document 1).

Here, in LTE, an upper limit is set for the maximum transmission power ($P_{CMAX}$) of each user device to reduce interference. The upper limit of the maximum transmission power is referred to as "$P_{CMAX\_H}$". Also to reduce interference, it is specified in LTE that the maximum transmission power is reduced when the transmission bandwidth (the number of RBs allocated for uplink) in each subframe is very large (maximum power reduction: MPR). Further, to meet regional conditions, it is specified that the maximum transmission power is further reduced in a specific band when an instruction is given from the network (additional maximum power reduction: A-MPR). The lower limit of the maximum transmission power according to these specifications is referred to as "$P_{CMAX\_L}$" (Non-Patent Document 2).

RELATED-ART DOCUMENTS

Non-Patent Documents

[Non-Patent Document 1] 3GPP TS36.213 V12.6.0 (2015-06)

[Non-Patent Document 2] 3GPP TS36.101 V13.0.0 (2015-07)

DISCLOSURE OF INVENTION

Problems to be Solved by the Invention

In LTE, to further increase the system capacity, to further increase the data transfer rate, and to further reduce delays in the wireless section, the fifth-generation (5G) radio communication technologies are being considered. In 5G, to achieve a low delay, it is being considered to make the TTI length, which is a minimum unit of scheduling, shorter than the TTI length (1 ms) in LTE. Accordingly, there is a possibility that CA is performed using a combination of cells (CCs) with different TTI lengths.

Also, at the initial stage of the introduction of 5G, it is expected that instead of operating a 5G radio communication system alone, an LTE radio communication system is operated in combination with the 5G radio communication system. For this reason, there is also a possibility that CA is performed using CCs in LTE and 5G with different TTI lengths.

However, no method is specified in the current LTE to calculate "$P_{CMAX\_L}$" and "$P_{CMAX\_H}$" when CA is performed between cells (CCs) with different TTI lengths. Also, the calculation methods of "$P_{CMAX\_L}$" and "$P_{CMAX\_H}$" specified in Non-Patent Document 2 are based on an assumption that the subframe lengths of CCs are the same (i.e., the TTI lengths are the same), and cannot be applied to a case where CA is performed between cells (CCs) with different TTI lengths.

One object of this disclosure is to solve or reduce the above-described problems, and to provide a technology that makes it possible to properly calculate the lower limit and the upper limit of the maximum transmission power for communications where CA is performed using CCs with different TTI lengths.

Means for Solving the Problems

An aspect of this disclosure provides a user device for a radio communication system that supports uplink carrier aggregation. The user device includes a transmitter that transmits an uplink signal to a base station by using a first component carrier and a second component carrier having a TTI length shorter than a TTI length of the first component carrier, and a calculator that calculates a lower limit and an upper limit of a maximum transmission power of the uplink signal according to predetermined formulas using one of a subframe of the first component carrier and a subframe of the second component carrier as a reference subframe.

Another aspect of this disclosure provides a base station for a radio communication system supporting uplink carrier aggregation. The base station includes a receiver that receives an uplink signal from a user device, and an instructor that instructs the user device whether to calculate a lower limit and an upper limit of a maximum transmission power of the uplink signal according to predetermined formulas using a subframe of a first component carrier as a reference subframe or to calculate the lower limit and the upper limit of the maximum transmission power of the uplink signal according to the predetermined formulas using a subframe of a second component carrier as the reference subframe, the second component carrier having a TTI length shorter than a TTI length of the first component carrier.

Advantageous Effect of the Invention

An aspect of this disclosure provides a technology that makes it possible to properly calculate the lower limit and the upper limit of the maximum transmission power for communications where CA is performed using CCs with different TTI lengths.

BRIEF DESCRIPTION OF THE DRAWINGS

FIG. 2 is a drawing used to describe calculation methods of $P_{CMAX\_L}$ and $P_{CMAX\_H}$ in async DC;

FIG. 3 is a drawing illustrating an example of a configuration of a radio communication system according to an embodiment;

FIG. 4B is a drawing used to describe calculation methods of $P_{CMAX\_L}$ and $P_{CMAX\_H}$ in a case where CCs with different TTI lengths are aggregated;

FIG. 5A is a drawing used to describe calculation methods of $P_{CMAX\_L}$ and $P_{CMAX\_H}$ in a case where CCs with different and variable TTI lengths are aggregated;

FIG. 5B is a drawing used to describe calculation methods of $P_{CMAX\_L}$ and $P_{CMAX\_H}$ in a case where CCs with different and variable TTI lengths are aggregated;

FIG. 6 is a sequence chart illustrating a process performed by a radio communication system according to an embodiment;

DESCRIPTION OF EMBODIMENTS

Figure 1:
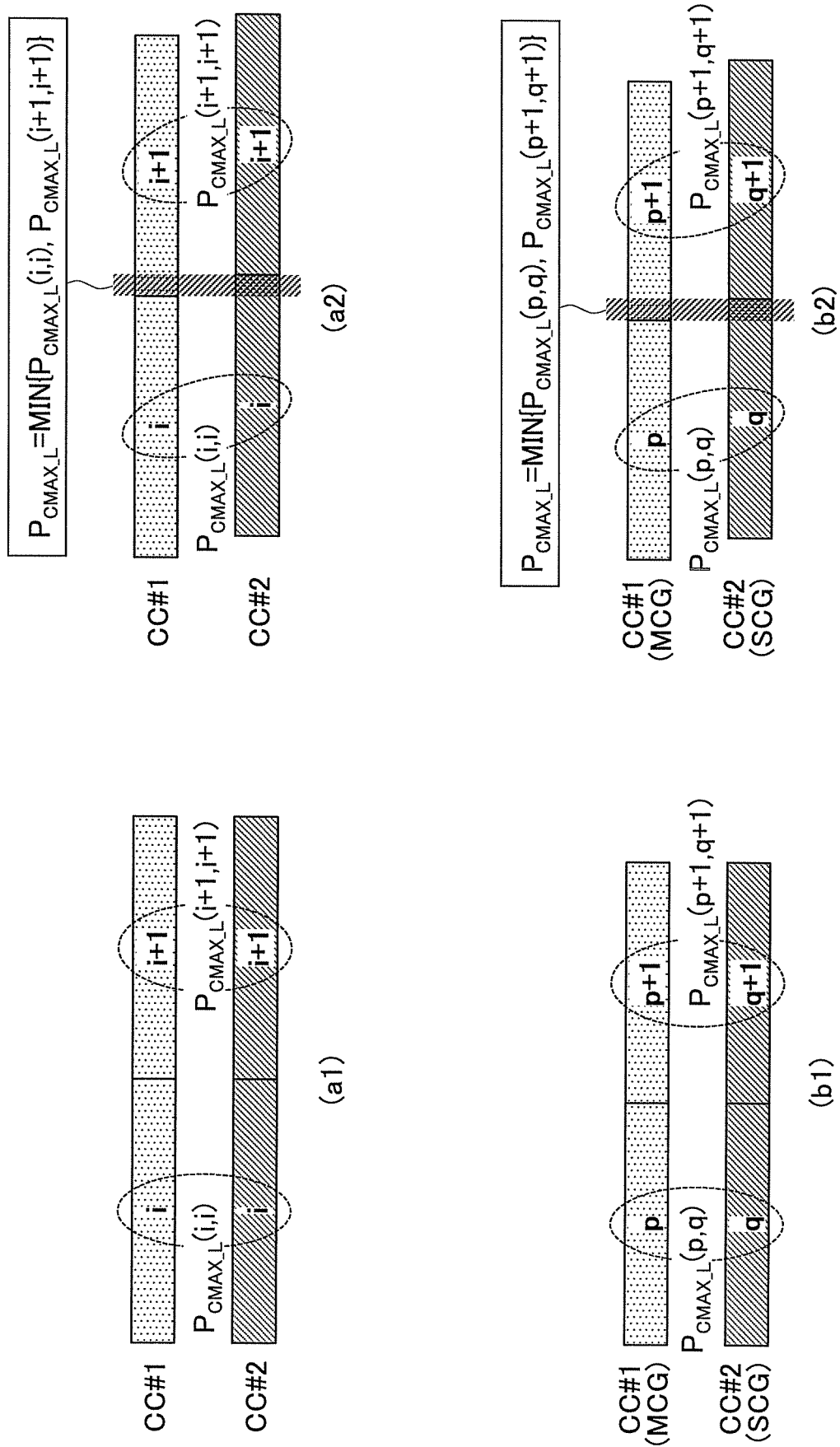
FIG. 1 is a drawing used to describe calculation methods of $P_{CMAX\_L}$ in UL CA and sync DC.

Embodiments of the present invention are described below with reference to the accompanying drawings. Embodiments described below are examples, and the present invention is not limited to those embodiments. For example, although it is assumed that a radio communication system according to the embodiments conforms to LTE, the present invention is not limited to LTE and may also be applied to other types of systems. In the specification and the claims of the present application, "LTE" is used in a broad sense and may indicate not only a communication system corresponding to 3GPP release 8 or 9, but also a fifth-generation communication system corresponding to 3GPP release 10, 11, 12, 13, 14, or later.

In the descriptions below, it is assumed that the TTI length is the same as the subframe length. However, the embodiments of the present invention may also be applied to a radio communication system where the TTI length is different from the subframe length. The embodiments of the present invention may be applied to a radio communication system where the TTI length is different from the subframe length by replacing "TTI length" in the descriptions below with "subframe length".

Related-Art Calculation Method of $P_{CMAX\_L}$ and $P_{CMAX\_H}$

As indicated by formula (1) below, Non-Patent Document 2 specifies that the maximum transmission power ($P_{CMAX}$) of each user device is a value that falls within a range between $P_{CMAX\_L}$ and $P_{CMAX\_H}$. Non-Patent Document 2 also specifies that $P_{CMAX\_L}$ and $P_{CMAX\_H}$ of a user device are calculated, respectively, by formula (2) and formula (3) below. A serving cell in formula (2) and formula (3) indicates an uplink CC used for communication.

[Formula 1]

$$P_{CMAX\_L} \leq P_{CMAX} \leq P_{CMAX\_H} \quad \text{(Formula 1)}$$

[Formula 2]

$$P_{CMAX\_L} = \text{MIN}\left\{10\log_{10}\sum \frac{\text{MIN}[p_{EMAX,c}/(\Delta t_{C,c}), p_{PowerClass}/(mpr_c \cdot a\text{-}mpr_c \cdot \Delta t_{C,c} \cdot \Delta t_{1B,c}), p_{PowerClass}/pmpr_c]}{\text{Calculated for each serving cell }(c)}, P_{PowerClass}\right\} \quad \text{(Formula 2)}$$

$P_{EMAX,c}$: True value of P-Max specified by network for serving cell (c)

$P_{PowerClass}$: Nominal maximum output power (power not including tolerance)

$mpr_c$: True value of maximum power reduction (MPR) at serving cell (c)

a-mpr$_c$: True value of additional maximum power reduction (A-MPR) at serving cell (c)

pmpr$_c$: True value of power management maximum power reduction (P-MPR) at serving cell (c)

Δt$_{C,c}$: One of values 1.41 and 1 determined by specific condition at serving cell (c)

Δt$_{IB,c}$: True value of additional tolerance at serving cell (c)

[Formula 3]

$$P_{CMAX\_H} = \text{MIN}\left\{ 10\log_{10}\underbrace{\sum p_{EMAX,c}}_{\text{Calculated for each serving cell }(c),\text{ and calculated values are totaled}}, P_{PowerClass} \right\} \quad \text{(Formula 3)}$$

As indicated by formula (2), "$P_{CMAX\_L}$" is obtained by calculating power levels for respective CCs (by using a formula corresponding to "calculated for each serving cell (c)" in formula (2)), and selecting a smaller one of a sum (E) of the calculated power levels of CCs and $P_{powerclass}$. According to formula (2), the upper limit of "$P_{CMAX\_L}$" is $P_{powerclass}$. Also, as indicated by formula (3), "$P_{CMAX\_H}$" is obtained by selecting a smaller one of a sum of the values of P-Max specified by the network for respective CCs and $P_{powerclass}$. According to formula (3), the upper limit of "$P_{CMAX\_H}$" is $P_{powerclass}$.

In the descriptions below, "$P_{CMAX\_L}(x,y)$" indicates $P_{CMAX\_L}$ that is calculated by pairing a subframe x of a specific CC and a subframe y of another CC different from the specific CC. In other words, $P_{CMAX\_L}(x,y)$ indicates a smaller one of a sum of a power level calculated from various parameters of the subframe x (e.g., $P_{EMAX,c}$, mpr$_c$) and a power level calculated from various parameters of the subframe y (e.g., $P_{EMAX,c}$, mpr$_c$) and $P_{powerclass}$. Similarly, "$P_{CMAX\_H}(x,y)$" indicates $P_{CMAX\_H}$ that is calculated by pairing a subframe x of a specific CC and a subframe y of another CC different from the specific CC. In other words, $P_{CMAX\_H}(x,y)$ indicates a smaller one of a sum of $P_{EMAX}$ in the subframe x and $P_{EMAX}$ in the subframe y and $P_{powerclass}$.

FIG. 1 is a drawing used to describe calculation methods of $P_{CMAX\_L}$ in UL CA and sync DC. FIG. 1 (a1) illustrates a state where subframes are synchronized in uplink CA using CC#1 and CC#2. In the state where the subframes of CC#1 and CC#2 are synchronized, "$P_{CMAX\_L}$" in respective subframes can be expressed as $P_{CMAX\_L}(i,i)$ and $P_{CMAX\_L}(i+1,i+1)$.

On the other hand, when different timing advances (TA) are applied to the CCs, the subframes of CC#1 and the subframes of CC#2 may become slightly out of sync with each other. In this case, as illustrated by FIG. 1 (a2), Non-Patent Document 2 specifies that in a portion where a subframe i and a subframe i+1 overlap each other, a smaller one of $P_{CMAX\_L}(i,i)$ in the subframe i and $P_{CMAX\_L}(i+1,i+1)$ in the subframe i+i is selected as $P_{CMAX\_L}$.

Each of FIG. 1 (b1) and FIG. 1 (b2) illustrates a calculation method of "$P_{CMAX\_L}$" in sync DC. The sync DC is a type of DC that is operated such that the boundaries of subframes of CCs constituting MCG and SCG are almost aligned with each other. FIG. 1 (b1) illustrates a state where the subframes of CC#1 and CC#2 are synchronized with each other. In the case of FIG. 1 (b1), "$P_{CMAX\_L}$" in respective subframes can be expressed as $P_{CMAX\_L}(p,q)$ and $P_{CMAX\_L}(p+1,q+1)$ Also in the sync DC, as illustrated by FIG. 1 (b2), there is a case where different timing advances (TA) are applied to the CCs, and the subframes of CC#1 and the subframes of CC#2 become slightly out of sync with each other. Also in this case, Non-Patent Document 2 specifies that in a portion where the subframes overlap each other, a smaller one of $P_{CMAX\_L}(p,q)$ and $P_{CMAX\_L}(p+1, q+1)$ is selected as $P_{CMAX\_L}$.

FIG. 2 is a drawing used to describe calculation methods of $P_{CMAX\_L}$ and $P_{CMAX\_H}$ in async DC. The async DC is a type of DC that is operated such that the boundaries of subframes of CCs constituting MCG and SCG are greatly misaligned with each other. For the async DC, Non-Patent Document 2 specifies different calculation methods of "$P_{CMAX\_L}$" and "$P_{CMAX\_H}$" for a case where the subframe of the CC in MCG is ahead of the subframe of the CC in SCG and a case where the subframe of the CC in SCG is ahead of the subframe of the CC in MCG. Here, the case where the subframe of the CC in MCG is ahead of the subframe of the CC in SCG indicates that the difference between the start point of the subframe of the CC in MCG and the start point of the subframe of the CC in SCG (the SCG subframe that is behind the MCG subframe) is less than or equal to 0.5 ms.

FIG. 2 (a) illustrates calculation methods for the case where the subframe of the CC in MCG is ahead of the subframe of the CC in SCG. Non-Patent Document 2 specifies that when the subframe of the CC in MCG is ahead of the subframe of the CC in SCG, an MCG subframe is set as a reference subframe, and a smaller one of two values of "$P_{CMAX\_L}$" obtained by pairing the reference subframe with each of two SCG subframes overlapping the reference subframe is selected as "$P_{CMAX\_L}$". Similarly, Non-Patent Document 2 specifies that a larger one of two values of "$P_{CMAX\_H}$" obtained by pairing the reference subframe with each of two SCG subframes overlapping the reference subframe is selected as "$P_{CMAX\_H}$". Specifically, as illustrated in FIG. 2 (a), a smaller one of $P_{CMAX\_L}(p,q)$ and $P_{CMAX\_L}(p,q-1)$ is selected as "$P_{CMAX\_L}$" for the period of the subframe p, and a larger one of $P_{CMAX\_H}(p,q)$ and $P_{CMAX\_H}(p,q-1)$ is selected as "$P_{CMAX\_H}$" for the period of the subframe p. Also for other subframes ( . . . , p−1, p+1, P+2, . . . ), "$P_{CMAX\_L}$" and "$P_{CMAX\_H}$" are calculated according to the same methods.

FIG. 2 (b) illustrates calculation methods for the case where the subframe of the CC in SCG is ahead of the subframe of the CC in MCG. In the case of FIG. 2 (b), an SCG subframe is set as a reference subframe, and "$P_{CMAX\_L}$" and "$P_{CMAX\_H}$" are calculated according to methods similar to those of FIG. 2 (a).

<System Configuration>

FIG. 3 is a drawing illustrating an example of a configuration of a radio communication system according to an embodiment. The radio communication system of the present embodiment includes a user device UE, a base station eNBa forming a cell "a", and a base station eNBb forming a cell "b". In the descriptions below, the base station eNBa and the base station eNBb may be collectively referred to as a "base station eNB" when distinction is not necessary.

Although FIG. 3 includes only one user device UE, the radio communication system may include multiple user devices UE. Also, although FIG. 3 includes the base station eNBa and the base station eNBb, the radio communication system may include one base station eNB or three or more base stations eNB. Also in FIG. 3, although the base station eNBa forms the cell "a" and the base station eNBb forms the cell "b", each of the base station eNBa and the base station eNBb may form multiple cells. Also, the base station eNBa and the base station eNBb may be an MeNB and an SeNB or an SeNB and an MeNB, respectively. CA in the present embodiment may be intra-eNB CA, inter-eNB CA, or a combination of intra-eNB CA and inter-eNB CA.

In the present embodiment, it is assumed that each of the cell "a" and the cell "b" includes a downlink CC and an uplink CC. However, each of the cell "a" and the cell "b" may include only an uplink CC. It is also assumed that the TTI length of the uplink CC of the cell "a" is different from the TTI length of the uplink CC of the cell "b". For example, the cell "a" may be a 4G (LTE) cell (TTI=1 ms), and the cell "b" may be a 5G cell (e.g., TTI=0.2 ms). Also, both of the cell "a" and the cell "b" may be 5G cells.

Also in the present embodiment, it is assumed that the user device UE performs uplink CA between a CC of the cell "a" and a CC of the cell "b". However, the user device UE may also be configured to perform uplink CA by aggregating three or more CCs. Also in the present embodiment, the communication scheme for the uplink CC may be Single-Carrier Frequency-Division Multiple Access (SC-FDMA) as in LTE, orthogonal frequency-division multiplexing (OFDM), or any other communication scheme.

<Calculations of "$P_{CMAX\_L}$" and "$P_{CMAX\_H}$">

The user device UE of the present embodiment may be configured to define each subframe of a CC with a long TTI length as a reference subframe, and to calculate "$P_{CMAX\_L}$" and "$P_{CMAX\_H}$" using formulas (2) and (3) described above. In the descriptions below, a method where each subframe of a CC with a long TTI length is defined as a reference subframe and "$P_{CMAX\_L}$" and "$P_{CMAX\_H}$" are calculated using formulas (2) and (3) described above is referred to as a "calculation method 1".

More specifically, the user device UE combines the reference subframe of the CC having the long TTI length with respective subframes of a CC having a short TTI length that are included between the start point and the end point of the reference subframe and with respective subframes of the CC having the short TTI length that cross one of the start point and the end point of the reference subframe, and calculates "$P_{CMAX\_L}$" for the period of the reference subframe by selecting the smallest "$P_{CMAX\_L}$" from "$P_{CMAX\_L}$" values calculated for the respective combinations. Similarly, the user device UE calculates "$P_{CMAX\_H}$" for the period of the reference subframe by selecting the largest "$P_{CMAX\_H}$" from "$P_{CMAX\_H}$" values calculated for the respective combinations.

Figure 4A:
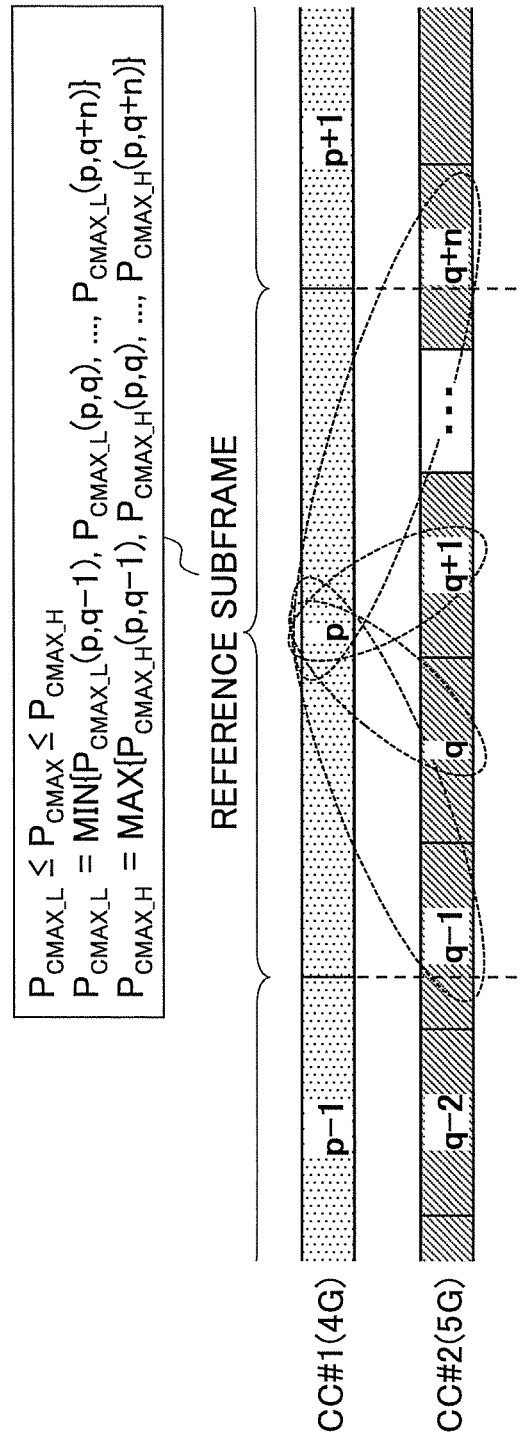
FIG. 4A is a drawing used to describe calculation methods of $P_{CMAX\_L}$ and $P_{CMAX\_H}$ in a case where CCs with different TTI lengths are aggregated.

FIGS. 4A and 4B are drawings used to describe calculation methods of $P_{CMAX\_L}$ and $P_{CMAX\_H}$ in a case where CCs with different TTI lengths are aggregated. An example is described with reference to FIG. 4A. The user device UE selects the smallest one of $P_{CMAX\_L}(p,q-1)$, $P_{CMAX\_L}(p,q)$, $P_{CMAX\_L}(p,q+1)$, and $P_{CMAX\_L}(p,q+n)$ as "$P_{CMAX\_L}$" for the period of the subframe p (reference subframe). Similarly, the user device UE selects the largest one of $P_{CMAX\_H}(p,q-1)$, $P_{CMAX\_H}(p,q)$ $P_{CMAX\_H}(p,q+1)$, and $P_{CMAX\_H}(p,q+n)$ as "$P_{CMAX\_H}$" for the period of the subframe p. The user device UE can continuously calculate "$P_{CMAX\_L}$" and "$P_{CMAX\_H}$" while performing uplink communications by performing this process for each subframe of CC#1.

Calculating "$P_{CMAX\_L}$" and "$P_{CMAX\_H}$" with the calculation method 1 makes the maximum transmission power ($P_{CMAX}$) constant in each subframe of the CC with the long TTI length, and thereby makes it possible to prevent degradation in the demodulation accuracy at the base station eNB providing the CC with the long TTI length due to power drop in the same subframe. That is, using the calculation method 1 makes it possible to prevent degradation in the communication quality of the CC with the long TTI length.

The user device UE of the present embodiment may also be configured to define each subframe of the CC with the short TTI length as a reference subframe, and to calculate "$P_{CMAX\_L}$" and "$P_{CMAX\_H}$" using formulas (2) and (3) described above. In the descriptions below, a method where each subframe of the CC with the short TTI length is defined as a reference subframe and "$P_{CMAX\_L}$" and "$P_{CMAX\_H}$" are calculated using formulas (2) and (3) described above is referred to as a "calculation method 2".

Specifically, when the reference subframe of the CC with the short TTI length crosses a subframe boundary of the CC with the long TTI length, the user device UE calculates "$P_{CMAX\_L}$" for the period of the reference subframe by selecting the smaller "$P_{CMAX\_L}$" from "$P_{CMAX\_L}$" values calculated for the combinations of the reference subframe and respective two subframes of the CC with the long TTI length that are located before and after the subframe boundary. Similarly, the user device UE calculates "$P_{CMAX\_H}$" for the period of the reference subframe by selecting the larger "$P_{CMAX\_H}$" from "$P_{CMAX\_H}$" values calculated for the respective combinations.

Also, when the reference subframe of the CC with the short TTI length does not cross any subframe boundary of the CC with the long TTI length, the user device UE calculates "$P_{CMAX\_L}$" and "$P_{CMAX\_H}$" by using the combination of the reference subframe and a subframe of the CC with the long TTI length that includes the start point and the end point of the reference subframe.

An example is described with reference to FIG. 4B. In the example of FIG. 4B, a subframe q−1 crosses the boundary between a subframe p−1 and a subframe p. In this case, the user device UE selects the smaller one of $P_{CMAX\_L}(p-1,q-1)$ and $P_{CMAX\_L}(p,q-1)$ as "$P_{CMAX\_L}$" for the period of the subframe q−1 (reference subframe). Similarly, the user device UE selects the larger one of $P_{CMAX\_H}(p-1,q-1)$ and $P_{CMAX\_H}(p,q-1)$ as "$P_{CMAX\_H}$" for the period of the subframe q−1. The user device UE also calculates "$P_{CMAX\_L}$" and "$P_{CMAX\_H}$" for a subframe q+n (reference subframe) crossing the boundary between the subframe p and a subframe p+1 in a similar manner.

In the example of FIG. 4B, a subframe q does not cross any subframe boundary of CC#1 (i.e., the subframe q is included in the period of the subframe p). In this case, the user device UE uses $P_{CMAX\_L}(p,q)$ and $P_{CMAX\_H}(p,q)$ as "$P_{CMAX\_L}$" and "$P_{CMAX\_H}$" for the period of the subframe q (reference subframe). The user device UE also calculates "$P_{CMAX\_L}$" and "$P_{CMAX\_H}$" for a subframe q+1 that does not cross any subframe boundary of CC#1 in a similar manner. The user device UE can continuously calculate "$P_{CMAX\_L}$" and "$P_{CMAX\_H}$" while performing uplink communications by performing this process for each subframe of CC#2.

Calculating "$P_{CMAX\_L}$" and "$P_{CMAX\_H}$" with the calculation method 2 makes the maximum transmission power ($P_{CMAX}$) constant in each subframe of the CC with the short TTI length, and thereby makes it possible to prevent degradation in the demodulation accuracy at the base station eNB providing the CC with the short TTI length due to power drop in the same subframe. Here, using the calculation method 1 has an advantage of making "$P_{CMAX\_L}$" constant in each subframe of the CC with the long TTI length. However, with the calculation method 1, there is a risk, for example, that the maximum transmission power is set at an unnecessarily low value for some of subframes of the CC with the short TTI length that overlap the subframe of the CC with the long TTI length, and the coverage of an area corresponding to the CC with the short TTI length is reduced. Using the calculation method 2 does not cause such a problem and makes it possible to prevent the reduction in area coverage. That is, using the calculation method 2 makes it possible to prevent degradation in the communication quality of the CC with the short TTI length.

Similarly to the related art, even when $P_{CMAX\_L}$ and $P_{CMAX\_H}$ are calculated using the calculation method 1 or the calculation method 2, the maximum transmission power ($P_{CMAX}$) of each user device is set at a value within a range between $P_{CMAX\_L}$ and $P_{CMAX\_H}$.

FIGS. 5A and 5B are drawings used to describe calculation methods of $P_{CMAX\_L}$ and $P_{CMAX\_H}$ in a case where CCs with different and variable TTI lengths are aggregated. FIGS. 5A and 5B illustrate a case where the TTI length (subframe length) of CC#2 is variable and the TTI length of the subframe q is different from that in FIGS. 4A and 4B.

Even when CCs with a variable TTI length are aggregated, the user device UE may calculate "$P_{CMAX\_L}$" and "$P_{CMAX\_H}$" using one of the calculation method 1 and the calculation method 2. Calculation methods of "$P_{CMAX\_L}$" and "$P_{CMAX\_H}$" for each subframe in FIGS. 5A and 5B are substantially the same as those described with reference to FIGS. 4A and 4B, and therefore their descriptions are omitted here.

<Selecting and Switching Between Calculation Method 1 and Calculation Method 2>
(Selecting Calculation Method 1 or Calculation Method 2)

In the present embodiment, the user device UE may be configured to always use the calculation method 1 (i.e., to set a subframe of the CC with the long TTI length as a reference frame) to calculate "$P_{CMAX\_L}$" and "$P_{CMAX\_H}$", or to always use the calculation method 2 (i.e., to set a subframe of the CC with the short TTI length as a reference frame) to calculate "$P_{CMAX\_L}$" and "$P_{CMAX\_H}$" Also, the user device UE may be configured to select whether to use the calculation method 1 or the calculation method 2 to calculate "$P_{CMAX\_L}$" and "$P_{CMAX\_H}$" according to an instruction from the base station eNB.

For example, as illustrated by FIG. 6 (a), the user device UE may be configured to calculate "$P_{CMAX\_L}$" and "$P_{CMAX\_H}$" using the calculation method 1 when an instruction signal (S11) from the base station eNB includes information indicating the calculation method 1, and to calculate "$P_{CMAX\_L}$" and "$P_{CMAX\_H}$" using the calculation method 2 when the instruction signal includes information indicating the calculation method 2. The instruction signal may be a physical layer (PHY) signal, a MAC layer signal, or an RRC signal. Also, the instruction signal may be transmitted from either one of the LTE (4G) base station eNB and the 5G base station eNB. Also, when instruction signals are received from both of the LTE (4G) base station eNB and the 5G base station eNB, the user device UE may be configured to give priority to the instruction signal from the LTE (4G) base station eNB (i.e., follow the instruction signal from the LTE (4G) base station eNB), or to give priority to the instruction signal from the 5G base station eNB (i.e., follow the instruction signal from the 5G base station eNB).

The base station eNB may be configured to instruct the user device UE whether to use the calculation method 1 or the calculation method 2 based on the communication quality (e.g., reference signal received quality (RSRQ), reference signal received power (RSRP), or channel quality indicator (CQI)) of each CC (the downlink CC of each cell constituting CA) reported from the user device UE.

Also, the user device UE may be configured to select by itself whether to use the calculation method 1 or the calculation method 2 to calculate "$P_{CMAX\_L}$" and "$P_{CMAX\_H}$".

For example, the user device UE may be configured to measure and compare the communication quality levels (e.g., RSRQ, RSRP, or CQI) of downlink CCs of cells (downlink CCs of the same cells as those providing uplink CCs to be aggregated) to select whether to use the first calculation method 1 or the second calculation method 2.

Also, the user device UE may be configured to report to the base station eNB whether the calculation method 1 or the calculation method 2 has been used. For example, as illustrated by FIG. 6 (b), the user device UE may be configured to transmit, to the base station eNB, a report signal (S21) including information indicating whether the calculation method 1 or the calculation method 2 has been used. The report signal may be a physical layer (PHY) signal, a MAC layer signal, or an RRC signal.

(Switching Between Calculation Method 1 and Calculation Method 2)

Figure 7:
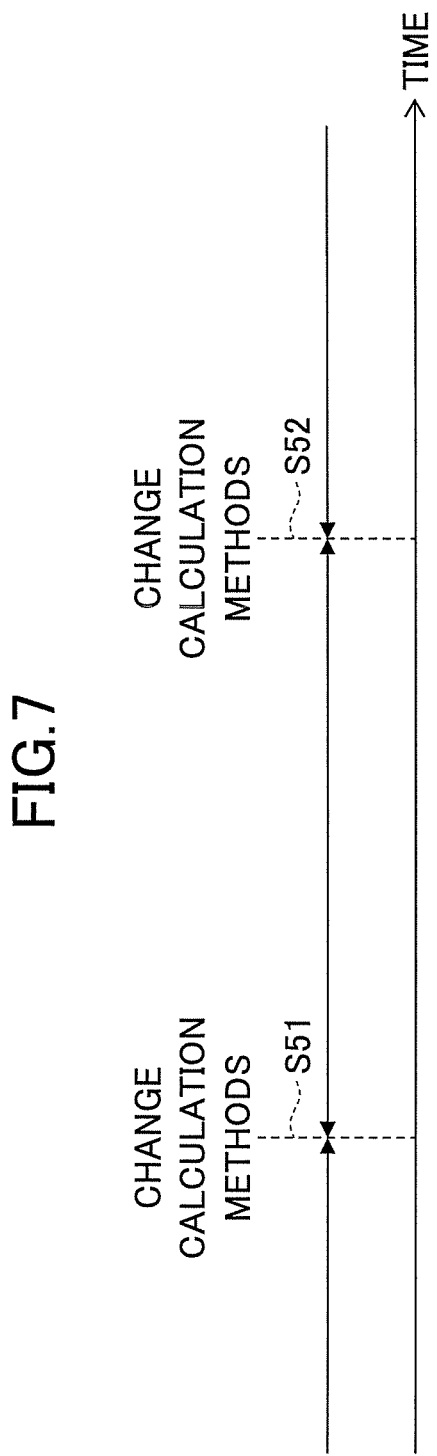
FIG. 7 is a drawing illustrating a process of switching calculation methods.

In the present embodiment, the user device UE may be configured to switch between the calculation method 1 and the calculation method 2 to calculate "$P_{CMAX\_L}$" and "$P_{CMAX\_H}$" at a predetermined timing. FIG. 7 is a drawing illustrating a process of switching calculation methods. In the example of FIG. 7, the calculation methods are switched at the timing of each of step S51 and step S52.

The user device UE may be configured to switch the calculation methods according to an instruction from the base station eNB or based on its own decision. When the calculation methods are switched according to an instruction from the base station eNB, the base station eNB may transmit an instruction signal (S11 in FIG. 6 (a)) to the user device UE, and the user device UE may switch the calculation methods at a timing when the instruction signal is received. Also, the timing when the user device UE switches the calculation methods may be at a subframe boundary of the CC with the short (or long) TTI length, or may be after a predetermined period of time from the timing when the user device UE decides to switch the calculation methods (or the timing when an instruction to switch the calculation methods is received from the base station eNB). Also, the calculation methods may be switched at any other appropriate timing.

Examples of criteria used by the base station eNB or the user device UE to switch the calculation methods are described below.

[Criterion (1)]

The user device UE or the base station eNB may be configured to switch (or instruct to switch) the calculation methods depending on whether priority is given to the communication quality of the CC with the long TTI length or the communication quality of the CC with the short TTI length. For example, the user device UE or the base station eNB may be configured to compare the amounts of data to be transmitted using respective uplink CCs and to switch (or instruct to switch) the calculation methods such that priority is given to the communication quality of one of the CCs with which a larger amount of data is to be transmitted. Also, the user device UE or the base station eNB may be configured to switch (or instruct to switch) the calculation methods such that priority is given to the communication quality of a CC for which a high-priority bearer (e.g., a bearer with a small QoS class identifier (QCI)) is set.

[Criterion (2)]

The user device UE or the base station eNB may be configured to switch (or instruct to switch) to the calculation method 1 at a timing when the communication quality of the CC with the long TTI length becomes good and to switch (or instruct to switch) to the calculation method 2 at a timing when the communication quality of the CC with the short TTI length becomes good, based on the communication quality levels (e.g., RSRQ, RSRP, or CQI) of the CCs. Alternatively, the user device UE or the base station eNB may be configured to switch (or instruct to switch) to the calculation method 2 at a timing when the communication quality of the CC with the long TTI length becomes good and to switch (or instruct to switch) to the calculation method 1 at a timing when the communication quality of the CC with the short TTI length becomes good.

[Criterion (3)]

The user device UE or the base station eNB may be configured to switch (or instruct to switch) to the calculation method 1 at a timing when the CC with the long TTI length is attached to MCG and to switch (or instruct to switch) to the calculation method 2 at a timing when the CC with the short TTI length is attached to MCG. Alternatively, the user device UE or the base station eNB may be configured to switch (or instruct to switch) to the calculation method 2 at a timing when the CC with the long TTI length is attached to MCG and to switch (or instruct to switch) to the calculation method 1 at a timing when the CC with the short TTI length is attached to MCG. Here, one of two cell groups (CGs) including a PCell is MCG and another one of the CGs including no PCell is SCG. Thus, that the CC with the long (or short) TTI length is attached to MCG indicates a case where a CG including the PCell changes to another CG due to, for example, handover.

[Criterion (4)]

The user device UE or the base station eNB may be configured to switch (or to instruct to switch) between the calculation method 1 and the calculation method 2 based on operational states of CCs.

For example, while the calculation method 1 is being used (i.e., while the reference frame is set in the CC with the long TTI length), the user device UE or the base station eNB may be configured to switch (or to instruct to switch) to the calculation method 2 when the CC with the long TTI length is deactivated, the TA timer of the CC is stopped, uplink transmission (e.g., SRS, PUCCH, or PUSCH) with the CC is not being performed, the CC transitions to a DRX state, or the CC transitions to a measurement gap state.

Similarly, while the calculation method 2 is being used (i.e., while the reference frame is set in the CC with the short TTI length), the user device UE or the base station eNB may be configured to switch (or to instruct to switch) to the calculation method 1 when the CC with the short TTI length is deactivated, the TA timer of the CC is stopped, uplink transmission (e.g., SRS, PUCCH, or PUSCH) with the CC is not being performed, the CC transitions to a DRX state, or the CC transitions to a measurement gap state.

<Calculations of "$P_{CMAX\_L}$" and "$P_{CMAX\_H}$" (Variations)>

When CA is performed using three or more CCs, the user device UE may be configured to calculate "$P_{CMAX\_L}$" and "$P_{CMAX\_H}$" using a combination of the calculation method 1, the calculation method 2, and the related-art calculation method. Variations of calculation methods are described below.

(Variation 1)

Figure 8:
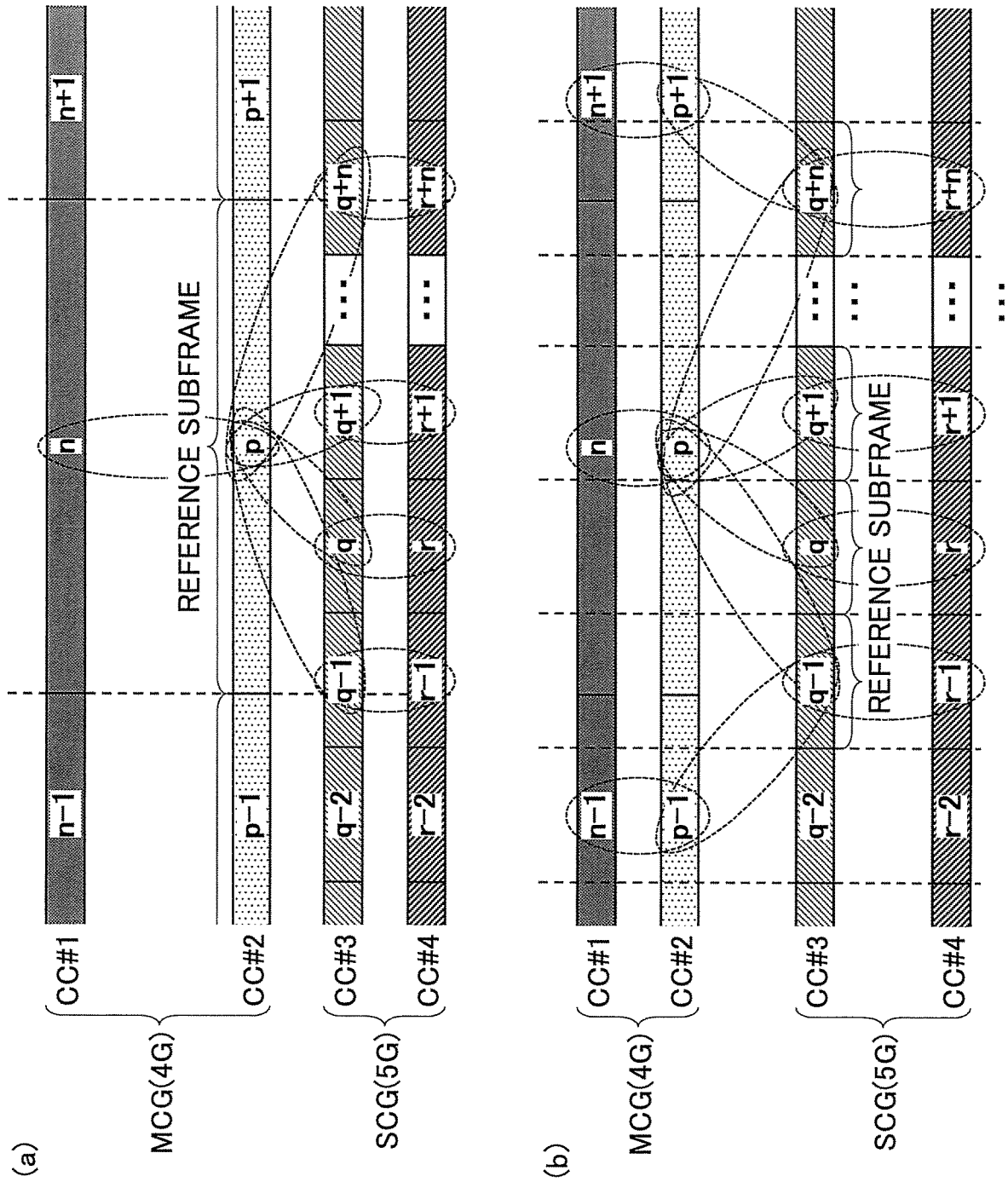
FIG. 8 is a drawing used to describe calculation methods (variation 1) of $P_{CMAX\_L}$ and $P_{CMAX\_H}$ in a case where CCs with different TTI lengths are aggregated.

FIG. 8 is a drawing used to describe a calculation method (variation 1) of $P_{CMAX\_L}$ and $P_{CMAX\_H}$ in a case where CCs with different TTI lengths are aggregated. In the example of FIG. 8, uplink CA is performed using CC#1 and CC#2 belonging to MCG and CC#3 and CC#4 belonging to SCG.

In the example of FIG. 8, the subframe intervals of CC#1 and CC#2 are the same, and the subframes of CC#1 and CC#2 are synchronized with each other. Also, the subframe intervals of CC#3 and CC#4 are the same, and the subframes of CC#3 and CC#4 are synchronized with each other. On the other hand, the subframe interval (TTI length) of CC#1 and CC#2 is different from the subframe interval (TTI length) of CC#3 and CC#4.

When CA is performed as illustrated by FIG. 8, $P_{CMAX\_L}$ and $P_{CMAX\_H}$ are first calculated for the combinations of subframes of CC#1 and CC#2 using the related-art calculation method (the calculation method of FIG. 1 (a1) or FIG. 1 (b1)), and the calculated $P_{CMAX\_L}$ and $P_{CMAX\_H}$ are set as tentative $P_{CMAX\_L}$ and $P_{CMAX\_H}$ for the subframes of CC#2.

Similarly, $P_{CMAX\_L}$ and $P_{CMAX\_H}$ are calculated for the combinations of subframes of CC#3 and CC#4 using the related-art calculation method (the calculation method of FIG. 1 (a1) or FIG. 1 (b1)), and the calculated $P_{CMAX\_L}$ and $P_{CMAX\_H}$ are set as tentative $P_{CMAX\_L}$ and $P_{CMAX\_H}$ for the subframes of CC#3.

Next, using the tentative $P_{CMAX\_L}$ and $P_{CMAX\_H}$, $P_{CMAX\_L}$ and $P_{CMAX\_H}$ are calculated for the combinations of subframes of CC#2 and CC#3 according to the calculation method 1 or the calculation method 2.

When $P_{CMAX\_L}$ and $P_{CMAX\_H}$ are calculated using the calculation method 1 or the calculation method 2 in each of the variations, the tentative "$P_{CMAX\_L}$" of each subframe and the tentative "$P_{CMAX\_H}$" of each subframe are used to calculate $P_{CMAX\_L}$ and $P_{CMAX\_H}$ for each combination of subframes.

As an example, assume a case where $P_{CMAX\_L}$ is obtained for a combination of tentative "$P_{CMAX\_L}$" of a subframe x of CC#2 and tentative "$P_{CMAX\_L}$" of a subframe y of CC#3. First, the tentative "$P_{CMAX\_L}$" of a subframe x of CC#2 and the tentative "$P_{CMAX\_L}$" of a subframe y of CC#3 are summed. This calculation corresponds to summing ($\Sigma$) values "calculated for each serving cell (c)" in formula (2). Next, when the sum is less than $P_{powerclass}$, the sum is used as $P_{CMAX\_L}$; and when the sum is greater than or equal to $P_{powerclass}$, $P_{powerclass}$ is used as $P_{CMAX\_L}$. This indicates that the upper limit of "$P_{CMAX\_L}$" is $P_{powerclass}$ as in formula (2). $P_{CMAX\_L}$ is calculated through the above process.

Similarly, assume a case where $P_{CMAX\_H}$ is obtained for a combination of tentative "$P_{CMAX\_H}$" of the subframe x of CC#2 and the tentative "$P_{CMAX\_H}$" of the subframe y of CC#3. First, the tentative "$P_{CMAX\_H}$" of a subframe x of CC#2 and the tentative "$P_{CMAX\_H}$" of the subframe y of CC#3 are summed. This calculation corresponds to "calculated for each serving cell (c), and calculated values are totaled" in formula (3). Next, when the sum is less than $P_{powerclass}$, the sum is used as $P_{CMAX\_H}$; and when the sum is greater than or equal to $P_{powerclass}$, $P_{powerclass}$ is used as $P_{CMAX\_H}$. This indicates that the upper limit of "$P_{CMAX\_H}$" is $P_{powerclass}$ as in formula (3) $P_{CMAX\_H}$ is calculated through the above process.

The above described calculation method of $P_{CMAX\_L}$ is equivalent to a process of calculating $P_{CMAX\_L}$ values of subframes of respective CCs using the part "calculated for each serving cell (c)" of formula (2), summing the calculated $P_{CMAX\_L}$ values of the CCs, using the sum as $P_{CMAX\_L}$ when the sum is less than $P_{powerclass}$, and using $P_{powerclass}$ as $P_{CMAX\_L}$ when the sum is greater than or equal to $P_{powerclass}$.

Similarly, the above described calculation method of $P_{CMAX\_H}$ is equivalent to a process of summing $P_{EMAX}$ values of subframes of respective CCs, using the sum as $P_{CMAX\_H}$ when the sum is less than $P_{powerclass}$, and using $P_{powerclass}$ as $P_{CMAX\_H}$ when the sum is greater than or equal to $P_{powerclass}$.

FIG. 8 (a) illustrates a case where $P_{CMAX\_L}$ and $P_{CMAX\_H}$ are calculated using the calculation method 1, and FIG. 8 (b) illustrates a case where $P_{CMAX\_L}$ and $P_{CMAX\_H}$ are calculated using the calculation method 2.

In the example of FIG. 8 (a), the user device UE calculates $P_{CMAX\_L}$ and $P_{CMAX\_H}$ for the combinations of subframes of CC#1 and CC#2 using the related-art calculation method, and sets the calculated $P_{CMAX\_L}$ and $P_{CMAX\_H}$ as tentative $P_{CMAX\_L}$ and $P_{CMAX\_H}$ for the subframes of CC#2. The user device UE also calculates $P_{CMAX\_L}$ and $P_{CMAX\_H}$ for the combinations of subframes of CC#3 and CC#4 using the related-art calculation method, and sets the calculated $P_{CMAX\_L}$ and $P_{CMAX\_H}$ as tentative $P_{CMAX\_L}$ and $P_{CMAX\_H}$ for the subframes of CC#3. Next, the user device UE sets each subframe of CC#2 as a reference subframe, and calculates "$P_{CMAX\_L}$" and "$P_{CMAX\_H}$" for the combinations of subframes of CC#2 and CC#3 by using the calculation method 1.

In the example of FIG. 8 (b), the user device UE calculates $P_{CMAX\_L}$ and $P_{CMAX\_H}$ for the combinations of subframes of CC#1 and CC#2 using the related-art calculation method, and sets the calculated $P_{CMAX\_L}$ and $P_{CMAX\_H}$ as tentative $P_{CMAX\_L}$ and $P_{CMAX\_H}$ for the subframes of CC#2. The user device UE also calculates $P_{CMAX\_L}$ and $P_{CMAX\_H}$ for the combinations of subframes of CC#3 and CC#4 using the related-art calculation method, and sets the calculated $P_{CMAX\_L}$ and $P_{CMAX\_H}$ as tentative $P_{CMAX\_L}$ and $P_{CMAX\_H}$ for the subframes of CC#3. Next, the user device UE sets each subframe of CC#3 as a reference subframe, and calculates "$P_{CMAX\_L}$" and "$P_{CMAX\_H}$" for the combinations of subframes of CC#2 and CC#3 by using the calculation method 2.

(Variation 2)

Figure 9:
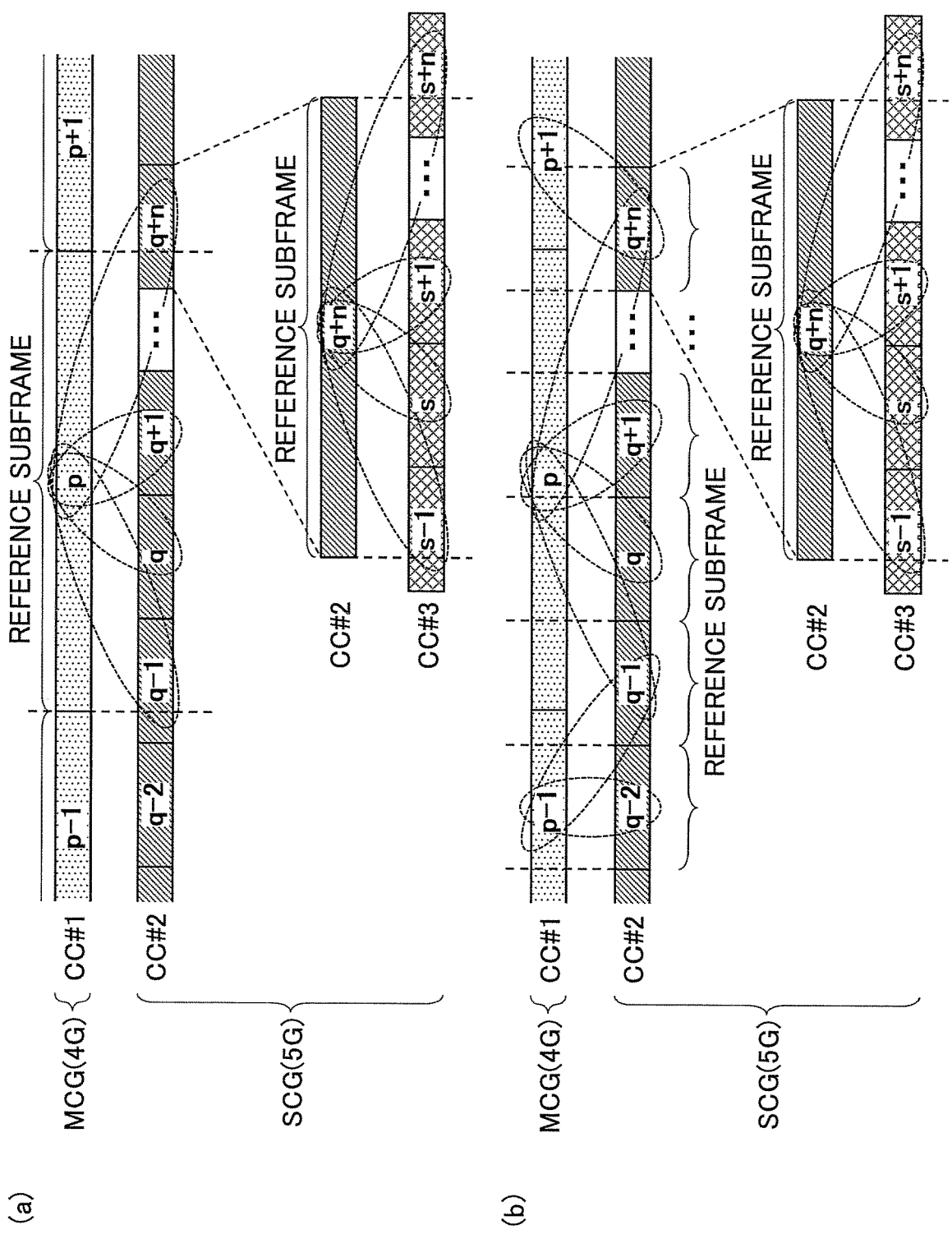
FIG. 9 is a drawing used to describe calculation methods (variation 2) of $P_{CMAX\_L}$ and $P_{CMAX\_H}$ in a case where CCs with different TTI lengths are aggregated.

FIG. 9 is a drawing used to describe a calculation method (variation 2) of $P_{CMAX\_L}$ and $P_{CMAX\_H}$ in a case where CCs with different TTI lengths are aggregated. In the example of FIG. 9, uplink CA is performed using CC#1 belonging to MCG and CC#2 and CC#3 belonging to SCG.

In the example of FIG. 9, the subframe intervals of CC#1 and CC#2 are different from each other, and the subframe intervals of CC#2 and CC#3 are also different from each other.

When CA is performed as illustrated by FIG. 9, $P_{CMAX\_L}$ and $P_{CMAX\_H}$ are first calculated for the combinations of subframes of CC#2 and CC#3 using the calculation method 1 (using each subframe of CC#2 as a reference subframe), and the calculated $P_{CMAX\_L}$ and $P_{CMAX\_H}$ are set as tentative $P_{CMAX\_L}$ and $P_{CMAX\_H}$ for the subframes of CC#2.

Next, using the tentative $P_{CMAX\_L}$ and $P_{CMAX\_H}$, $P_{CMAX\_L}$ and $P_{CMAX\_H}$ are calculated for the combinations of subframes of CC#1 and CC#2 according to the calculation method 1 or the calculation method 2.

FIG. 9 (a) illustrates a case where $P_{CMAX\_L}$ and $P_{CMAX\_H}$ are calculated using the calculation method 1, and FIG. 9 (b) illustrates a case where $P_{CMAX\_L}$ and $P_{CMAX\_H}$ are calculated using the calculation method 2.

In the example of FIG. 9 (a), the user device UE calculates $P_{CMAX\_L}$ and $P_{CMAX\_H}$ for the combinations of subframes of CC#2 and CC#3 using the calculation method 1, and sets the calculated $P_{CMAX\_L}$ and $P_{CMAX\_H}$ as tentative $P_{CMAX\_L}$ and $P_{CMAX\_H}$ for the subframes of CC#2. Next, the user device UE sets each subframe of CC#1 as a reference subframe, and calculates "$P_{CMAX\_L}$" and "$P_{CMAX\_H}$" for the combinations of subframes of CC#1 and CC#2 by using the calculation method 1.

In the example of FIG. 9 (b), the user device UE calculates $P_{CMAX\_L}$ and $P_{CMAX\_H}$ for the combinations of subframes of CC#2 and CC#3 using the calculation method 1, and sets the calculated $P_{CMAX\_L}$ and $P_{CMAX\_H}$ as tentative $P_{CMAX\_L}$ and $P_{CMAX\_H}$ for the subframes of CC#2. Next, the user device UE sets each subframe of CC#2 as a reference subframe, and calculates "$P_{CMAX\_L}$" and "$P_{CMAX\_H}$" for the combinations of subframes of CC#1 and CC#2 by using the calculation method 2.

(Variation 3)

Figure 10:
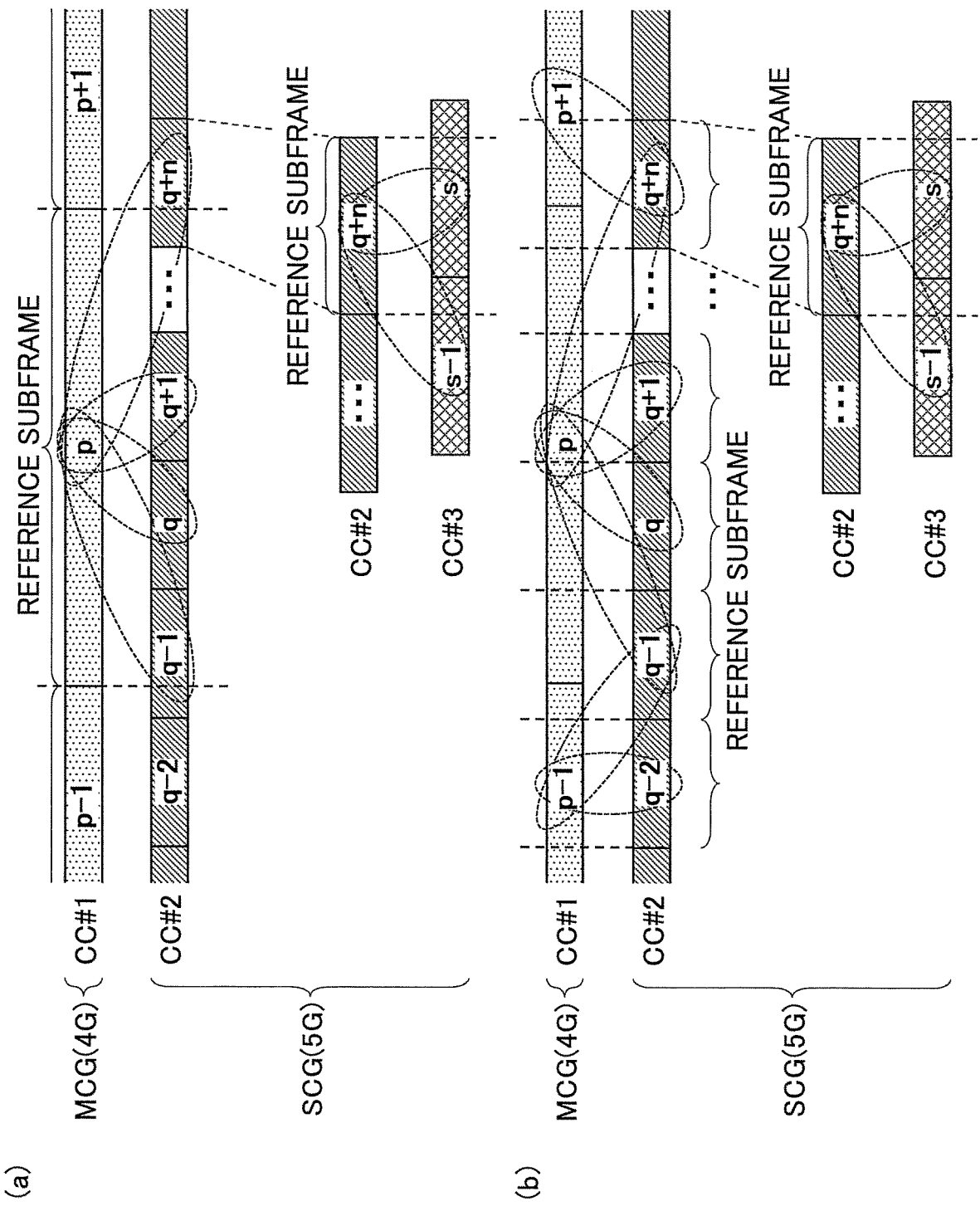
FIG. 10 is a drawing used to describe calculation methods (variation 3) of $P_{CMAX\_L}$ and $P_{CMAX\_H}$ in a case where CCs with different TTI lengths are aggregated.

FIG. 10 is a drawing used to describe a calculation method (variation 3) of $P_{CMAX\_L}$ and $P_{CMAX\_H}$ in a case where CCs with different TTI lengths are aggregated. In the example of FIG. 10, uplink CA is performed using CC#1 belonging to MCG and CC#2 and CC#3 belonging to SCG.

In the example of FIG. 10, the subframe intervals of CC#2 and CC#3 are the same, but the subframes of CC#2 and CC#3 are not synchronized with each other. Also, the subframe intervals of CC#1 and CC#2 are different from each other.

When CA is performed as illustrated by FIG. 10, $P_{CMAX\_L}$ and $P_{CMAX\_H}$ are first calculated for the combinations of subframes of CC#2 and CC#3 using the related-art calculation method (the calculation method of FIG. 2 (a)), and the calculated $P_{CMAX\_L}$ and $P_{CMAX\_H}$ are set as tentative $P_{CMAX\_L}$ and $P_{CMAX\_H}$ for the subframes of CC#2.

Next, using the tentative $P_{CMAX\_L}$ and $P_{CMAX\_H}$, $P_{CMAX\_L}$ and $P_{CMAX\_H}$ are calculated for the combinations of subframes of CC#1 and CC#2 according to the calculation method 1 or the calculation method 2.

FIG. 10 (a) illustrates a case where $P_{CMAX\_L}$ and $P_{CMAX\_H}$ are calculated using the calculation method 1, and FIG. 10 (b) illustrates a case where $P_{CMAX\_L}$ and $P_{CMAX\_H}$ are calculated using the calculation method 2.

In the example of FIG. 10 (a), the user device UE calculates $P_{CMAX\_L}$ and $P_{CMAX\_H}$ for the combinations of subframes of CC#2 and CC#3 using the related-art calculation method, and sets the calculated $P_{CMAX\_L}$ and $P_{CMAX\_H}$ as tentative $P_{CMAX\_L}$ and $P_{CMAX\_H}$ for the subframes of CC#2. Next, the user device UE sets each subframe of CC#1 as a reference subframe, and calculates $P_{CMAX\_L}$ and $P_{CMAX\_H}$ for the combinations of subframes of CC#1 and CC#2 by using the calculation method 1.

In the example of FIG. 10 (b), the user device UE calculates $P_{CMAX\_L}$ and $P_{CMAX\_H}$ for the combinations of subframes of CC#2 and CC#3 using the related-art calculation method, and sets the calculated $P_{CMAX\_L}$ and $P_{CMAX\_H}$ as tentative $P_{CMAX\_L}$ and $P_{CMAX\_H}$ for the subframes of CC#2. Next, the user device UE sets each subframe of CC#2 as a reference subframe, and calculates $P_{CMAX\_L}$ and $P_{CMAX\_H}$ for the combinations of subframes of CC#1 and CC#2 by using the calculation method 2.

(Variation 4)

As still another variation, the user device UE may be configured to handle multiple consecutive subframes as one reference subframe in the calculation method 2. For example, in the example of FIG. 4B, the user device UE may handle two consecutive subframes (p and p+1) as one reference subframe. Because there may be cases where the values of $P_{CMAX\_L}$ and $P_{CMAX\_H}$ do not frequently change, this method makes it possible to reduce the processing load of the user device UE.

Variations of the calculation methods are described above. According to the embodiments of the present invention, it is possible to calculate "$P_{CMAX\_L}$" and "$P_{CMAX\_H}$" regardless of how CCs are combined in CA by combining the calculation method 1, the calculation method 2, and the related-art calculation method.

<Functional Configurations>

Examples of functional configurations of the user device UE and the base station eNB that perform the methods of the above embodiments are described below.

(User Device)

Figure 11:
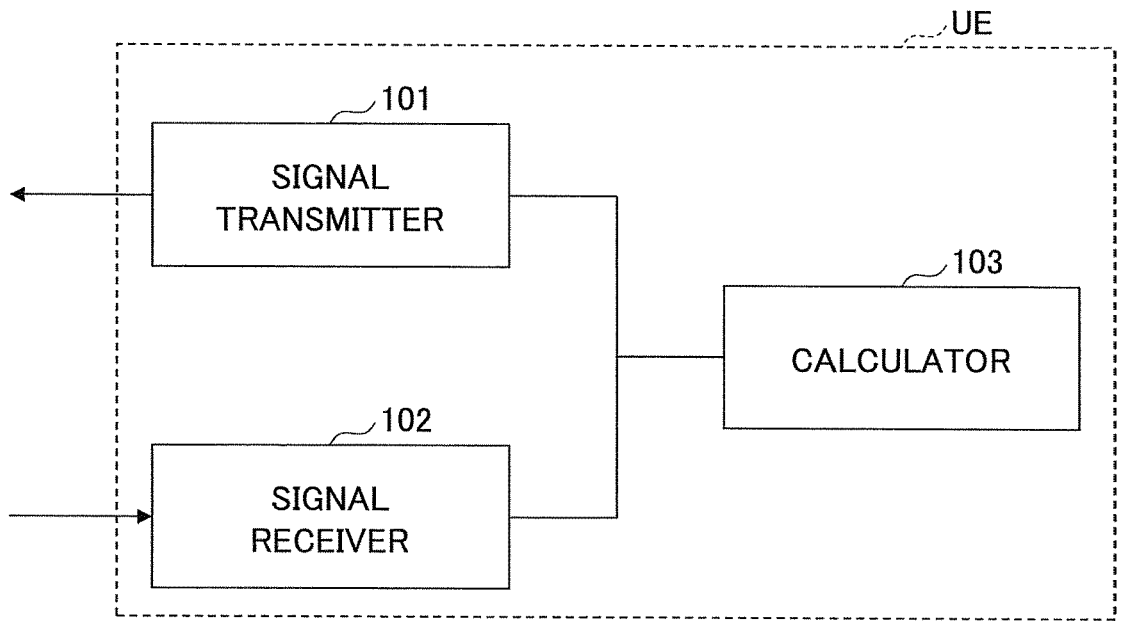
FIG. 11 is a drawing illustrating an example of a functional configuration of a user device according to an embodiment.

FIG. 11 is a drawing illustrating an example of a functional configuration of a user device according to an embodiment. As illustrated by FIG. 11, the user device UE includes a signal transmitter 101, a signal receiver 102, and a calculator 103. FIG. 11 illustrates only functional components of the user device UE that are particularly relevant to the present embodiment, and the user device UE may also at least include unshown functional components that are necessary for operations conforming to LTE. Also, the functional configuration of FIG. 11 is just an example. As long as operations related to the present embodiment can be performed, the categorization and the names of the functional components may be freely changed.

The signal transmitter 101 includes a function to wirelessly transmit various physical layer signals. The signal receiver 102 includes a function to wirelessly receive various signals from the base station eNB, and obtain upper layer signals from the received physical layer signals. Each of the signal transmitter 101 and the signal receiver 102 includes a function to perform CA communications by aggregating multiple CCs. Also, each of the signal transmitter 101 and the signal receiver 102 includes a function to perform CA communications according to DC between MeNB and SeNB.

The calculator 103 includes a function to calculate $P_{CMAX\_L}$ and $P_{CMAX\_H}$ for an uplink signal according to predetermined formulas using one of a subframe of a CC with a long TTI length and a subframe of a CC with a short TTI length as a reference subframe.

Also, the calculator 103 may be configured to select, based on an instruction from the base station eNB or downlink communication quality, whether to calculate $P_{CMAX\_L}$ and $P_{CMAX\_H}$ according to the predetermined formulas using the subframe of the CC with the long TTI length as the reference subframe or to calculate $P_{CMAX\_L}$ and $P_{CMAX\_H}$ according to the predetermined formulas using the subframe of the CC with the short TTI length as the reference subframe.

Also, the calculator 103 may be configured to switch, at a predetermined timing, between a method of calculating $P_{CMAX\_L}$ and $P_{CMAX\_H}$ according to the predetermined formulas using the subframe of the CC with the long TTI length as the reference subframe and a method of calculating $P_{CMAX\_L}$ and $P_{CMAX\_H}$ according to the predetermined formulas using the subframe of the CC with the short TTI length as the reference subframe. The predetermined timing may be determined according to the criteria described in "SWITCHING BETWEEN CALCULATION METHOD 1 AND CALCULATION METHOD 2".

(Base Station)

Figure 12:
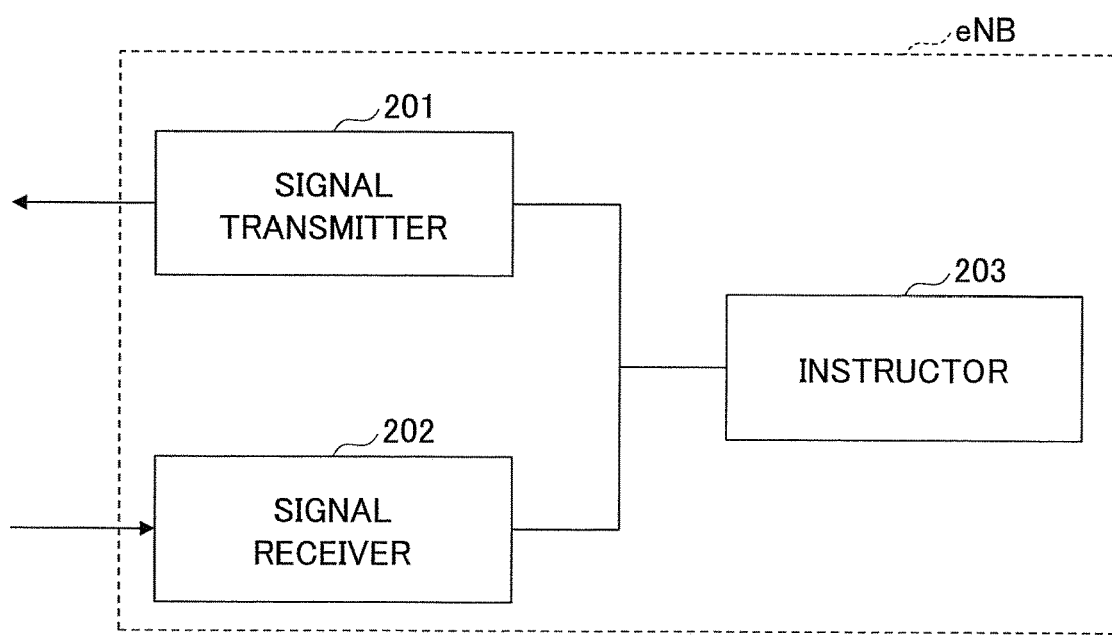
FIG. 12 is a drawing illustrating an example of a functional configuration of a base station according to an embodiment.

FIG. 12 is a drawing illustrating an example of a functional configuration of a base station according to an embodiment. As illustrated by FIG. 12, the base station eNB includes a signal transmitter 201, a signal receiver 202, and an instructor 203. FIG. 12 illustrates only functional components of the base station eNB that are particularly relevant to the present embodiment, and the base station eNB may also at least include unshown functional components that are necessary for operations conforming to LTE. Also, the functional configuration of FIG. 12 is just an example. As long as operations related to the present embodiment can be performed, the categorization and the names of the functional components may be freely changed.

The signal transmitter 201 includes a function to wirelessly transmit various physical layer signals. The signal receiver 202 includes a function to wirelessly receive various signals from the user devices UE, and obtain upper layer signals from the received physical layer signals. Each of the signal transmitter 201 and the signal receiver 202 includes a function to perform CA communications by aggregating multiple CCs.

The instructor 203 includes a function to instruct the user device UE whether to calculate $P_{CMAX\_L}$ and $P_{CMAX\_H}$ according to predetermined formulas using a subframe of a CC with a long TTI length as a reference subframe (i.e., calculating $P_{CMAX\_L}$ and $P_{CMAX\_H}$ according to the calculation method 1) or to calculate $P_{CMAX\_L}$ and $P_{CMAX\_H}$ according to the predetermined formulas using a subframe of a CC with a short TTI length as the reference subframe (i.e., calculating $P_{CMAX\_L}$ and $P_{CMAX\_H}$ according to the calculation method 2).

Also, the instructor 203 may be configured to instruct the user device UE, at a predetermined timing, to select one of the subframe of the CC with the long TTI length (i.e., calculating $P_{CMAX\_L}$ and $P_{CMAX\_H}$ according to the calculation method 1) and the subframe of the CC with the short TTI length (i.e., calculating $P_{CMAX\_L}$ and $P_{CMAX\_H}$ according to the calculation method 2) as the reference subframe. The predetermined timing may be determined according to the criteria described in "SWITCHING BETWEEN CALCULATION METHOD 1 AND CALCULATION METHOD 2".

The entire functional configuration of each of the user device UE and the base station eNB described above may be implemented by a hardware circuit(s) (e.g., one or more IC chips). Alternatively, a part of the functional configuration may be implemented by a hardware circuit(s) and the remaining part of the functional configuration may be implemented by a CPU and programs.

(User Device)

Figure 13:
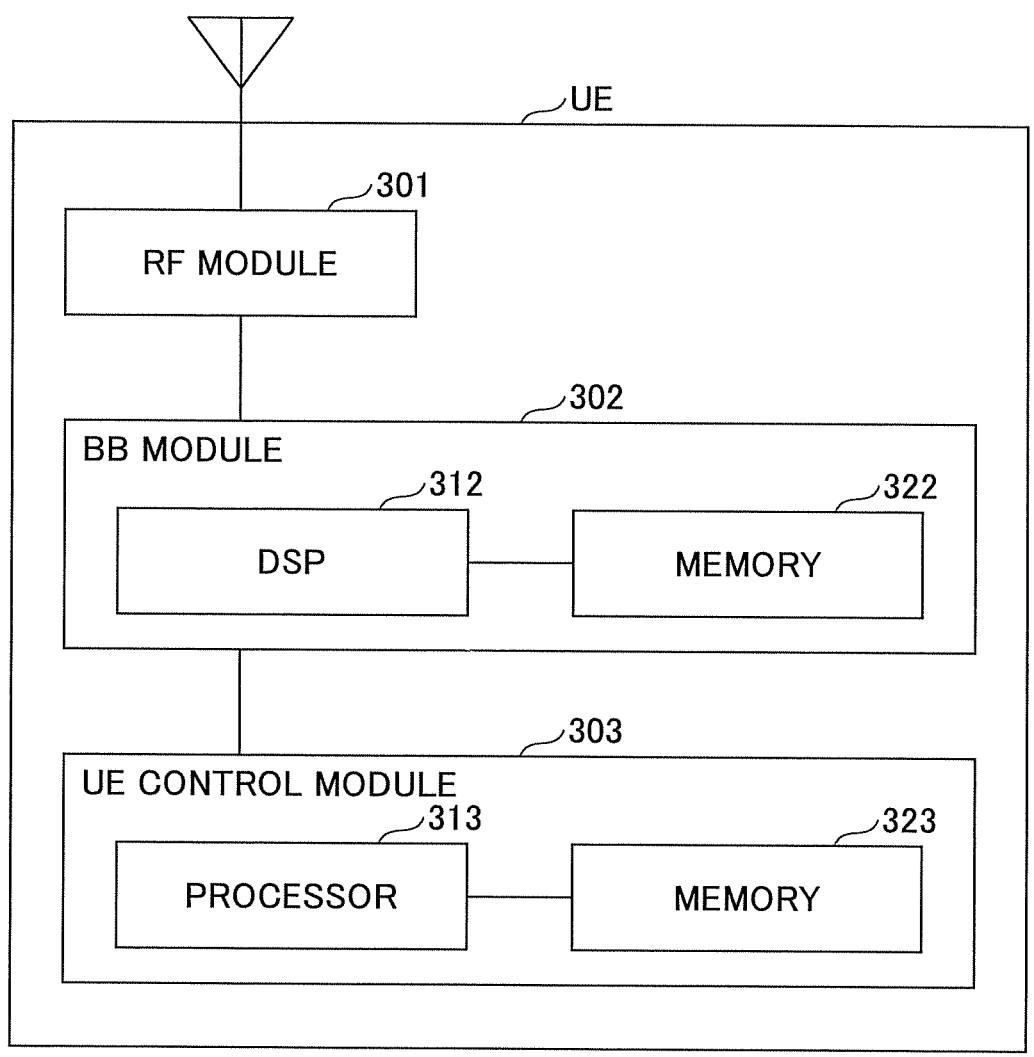
FIG. 13 is a drawing illustrating an example of a hardware configuration of a user device according to an embodiment.

FIG. 13 is a drawing illustrating an example of a hardware configuration of a user device according to an embodiment. FIG. 13 illustrates a configuration that is closer than FIG. 11 to an actual implementation. As illustrated by FIG. 13, the user device UE includes a radio frequency (RF) module 301 that performs processes related to radio signals, a baseband (BB) processing module 302 that performs baseband signal processing, and a UE control module 303 that performs processes in upper layers.

The RF module 301 performs processes such as digital-to-analog (D/A) conversion, modulation, frequency conversion, and power amplification on a digital baseband signal received from the BB processing module 302 to generate a radio signal to be transmitted from an antenna. Also, the RF module 301 performs processes such as frequency conversion, analog-to-digital (A/D) conversion, and demodulation on a received radio signal to generate a digital baseband signal, and inputs the digital baseband signal to the BB processing module 302. The RF module 301 may include, for example, a part of the signal transmitter 101 and a part of the signal receiver 102 in FIG. 11.

The BB processing module 302 converts an IP packet into a digital baseband signal and vice versa. A digital signal processor (DSP) 312 is a processor that performs signal processing in the BB processing module 302. A memory 322 is used as a work area of the DSP 312. The BB processing module 302 may include, for example, a part of the signal transmitter 101, a part of the signal receiver 102, and a part of the calculator 103 in FIG. 11.

The UE control module 303 performs protocol processing in the IP layer and processes related to applications. A processor 313 performs processes of the UE control module 303. A memory 323 is used as a work area of the processor 313. The UE control module 303 may include, for example, a part of the calculator 103 in FIG. 11.

(Base Station)

Figure 14:
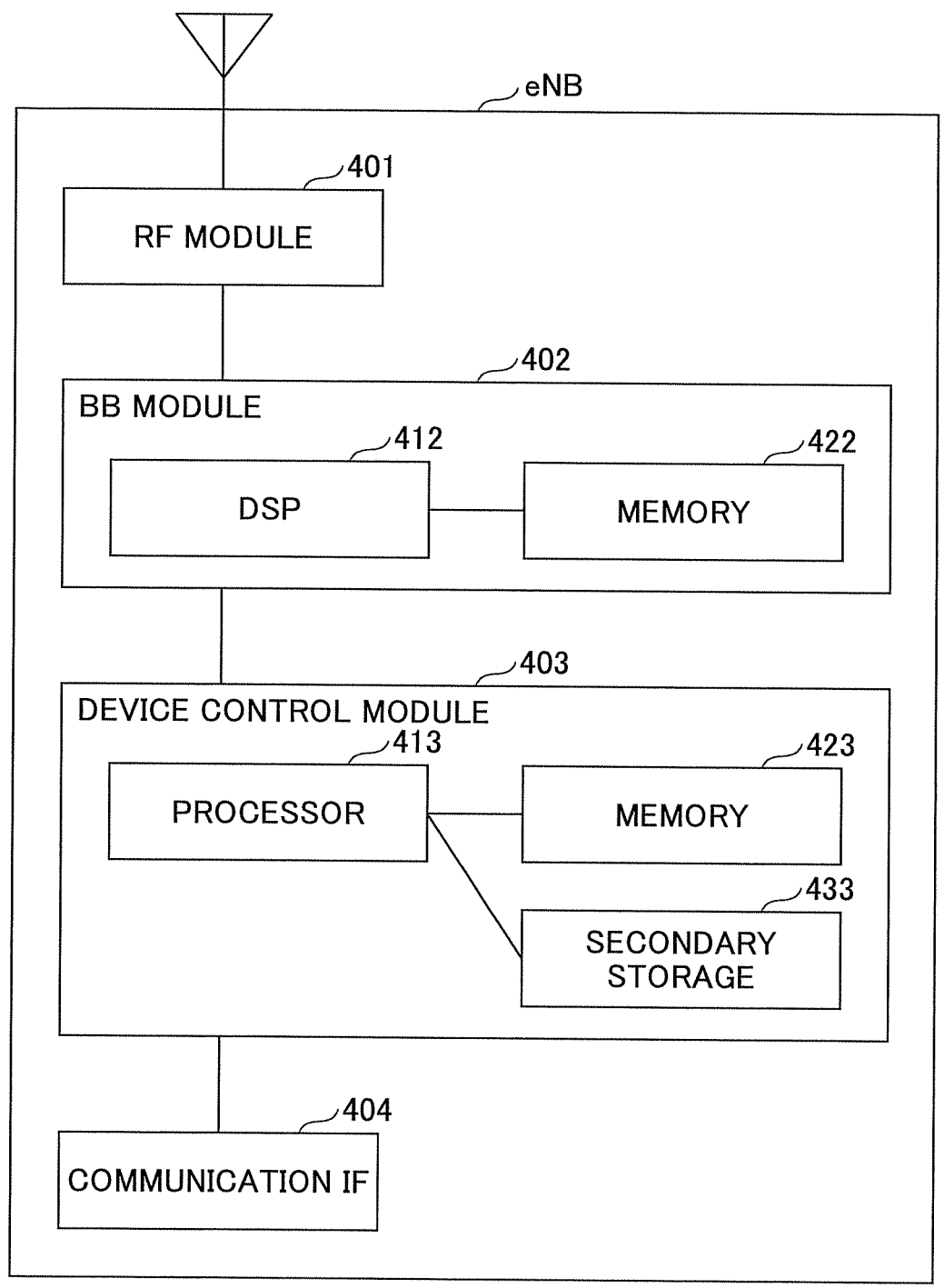
FIG. 14 is a drawing illustrating an example of a hardware configuration of a base station according to an embodiment.

FIG. 14 is a drawing illustrating an example of a hardware configuration of a base station according to an embodiment. FIG. 14 illustrates a configuration that is closer than FIG. 12 to an actual implementation. As illustrated by FIG. 14, the base station eNB includes an RF module 401 that performs processes related to radio signals, a BB processing module 402 that performs baseband signal processing, a device control module 403 that performs processes in upper layers, and a communication IF 404 that is an interface for connection with a network.

The RF module 401 performs processes such as D/A conversion, modulation, frequency conversion, and power amplification on a digital baseband signal received from the BB processing module 402 to generate a radio signal to be transmitted from an antenna. Also, the RF module 401 performs processes such as frequency conversion, A/D conversion, and demodulation on a received radio signal to generate a digital baseband signal, and inputs the digital baseband signal to the BB processing module 402. The RF module 401 may include, for example, a part of the signal transmitter 201 and a part of the signal receiver 202 in FIG. 12.

The BB processing module 402 converts an IP packet into a digital baseband signal and vice versa. A DSP 412 is a processor that performs signal processing in the BB processing module 402. A memory 422 is used as a work area of the DSP 412. The BB processing module 402 may include, for example, a part of the signal transmitter 201, a part of the signal receiver 202, and a part of the instructor 203 in FIG. 12.

The device control module 403 performs protocol processing in the IP layer and operation and maintenance (OAM) processing. A processor 413 performs processes of the device control module 403. A memory 423 is used as a work area of the processor 413. A secondary storage 433 is, for example, an HDD and stores various settings for operations of the base station eNB itself. The device control module 403 may include, for example, a part of the instructor 203 in FIG. 12.

SUMMARY

An embodiment of the present invention provides a user device for a radio communication system supporting uplink carrier aggregation. The user device includes a transmitter that transmits an uplink signal to a base station by using a first component carrier and a second component carrier having a TTI length shorter than a TTI length of the first component carrier, and a calculator that calculates a lower limit and an upper limit of a maximum transmission power of the uplink signal according to predetermined formulas using one of a subframe of the first component carrier and a subframe of the second component carrier as a reference subframe. This user device UE provides a technology that makes it possible to properly calculate the lower limit and the upper limit of the maximum transmission power for communications where CA is performed using CCs with different TTI lengths.

In a case where the lower limit and the upper limit of the maximum transmission power of the uplink signal are calculated according to the predetermined formulas by using the subframe of the first component carrier as the reference subframe, the calculator may be configured to combine the subframe of the first component carrier with respective subframes of the second component carrier that are included between a start point and an end point of the subframe of the first component carrier and with respective subframes of the second component carrier that cross one of the start point and the end point of the subframe of the first component carrier, to calculate the lower limit of the maximum transmission power using one of the combinations whose lower limit of the maximum transmission power is smallest, and to calculate the upper limit of the maximum transmission power using one of the combinations whose upper limit of the maximum transmission power is largest. This configuration makes the maximum transmission power ($P_{cmax}$) constant in each subframe of a CC with a long TTI length, and thereby makes it possible to prevent degradation in the demodulation accuracy at the base station eNB due to power drop in the same subframe. That is, this configuration makes it possible to prevent degradation in the communication quality of the CC with the long TTI length.

In a case where the lower limit and the upper limit of the maximum transmission power are calculated for each subframe of the uplink signal according to the predetermined formulas by using the subframe of the second component carrier as the reference subframe, when the subframe of the second component carrier crosses a subframe boundary of the first component carrier, the calculator may combine the subframe of the second component carrier with respective two subframes of the first component carrier before and after the subframe boundary, calculate the lower limit of the maximum transmission power using one of the combinations whose lower limit of the maximum transmission power is smaller, and calculate the upper limit of the maximum transmission power using one of the combinations whose upper limit of the maximum transmission power is larger; and when the subframe of the second component carrier does not cross the subframe boundary of the first component carrier, the calculator may calculate the lower limit and the upper limit of the maximum transmission power using a combination of the subframe of the second component carrier and a subframe of the first component carrier that includes a start point and an end point of the subframe of the second component carrier. This configuration makes the maximum transmission power ($P_{cmax}$) constant in each subframe of a CC with a short TTI length, and thereby makes it possible to prevent degradation in the demodulation accuracy at the base station eNB due to power drop in the same subframe. Also, this configuration makes it possible to prevent the reduction in coverage of the CC with the short TTI length.

The calculator may be configured to select, based on an instruction from the base station or a downlink communication quality, whether to calculate the lower limit and the upper limit of the maximum transmission power of the uplink signal according to the predetermined formulas using the subframe of the first component carrier as the reference subframe or to calculate the lower limit and the upper limit of the maximum transmission power of the uplink signal according to the predetermined formulas using the subframe of the second component carrier as the reference subframe.

This configuration enables the user device UE to select one of the calculation method 1 and the calculation method 2 implemented in the user device UE.

The calculator may be configured to switch, at a predetermined timing, between a method of calculating the lower limit and the upper limit of the maximum transmission power of the uplink signal according to the predetermined formulas using the subframe of the first component carrier as the reference subframe and a method of calculating the lower limit and the upper limit of the maximum transmission power of the uplink signal according to the predetermined formulas using the subframe of the second component carrier as the reference subframe. With this configuration, instead of continuously using one of the calculation method 1 and the calculation method 2, the user device UE can switch between the calculation method 1 and the calculation method 2 at an appropriate timing such as a timing when the communication status of a CC changes.

The calculator may be configured to report, to the base station, whether the lower limit and the upper limit of the maximum transmission power of the uplink signal is calculated according to the predetermined formulas using the subframe of the first component carrier as the reference subframe or the lower limit and the upper limit of the maximum transmission power of the uplink signal are calculated according to the predetermined formulas using the subframe of the second component carrier as the reference subframe. This configuration enables the base station eNB to identify which one of the calculation method 1 and the calculation method 2 is used by the user device UE to calculate $P_{CMAX\_L}$ and $P_{CMAX\_H}$.

Another embodiment of the present invention provides a base station for a radio communication system supporting uplink carrier aggregation. The base station includes a receiver that receives an uplink signal from a user device, and an instructor that instructs the user device whether to calculate a lower limit and an upper limit of a maximum transmission power of the uplink signal according to predetermined formulas using a subframe of a first component carrier as a reference subframe or to calculate the lower limit and the upper limit of the maximum transmission power of the uplink signal according to the predetermined formulas using a subframe of a second component carrier as the reference subframe, the second component carrier having a TTI length shorter than a TTI length of the first component carrier. This base station eNB provides a technology that makes it possible to properly calculate the lower limit and the upper limit of the maximum transmission power for communications where CA is performed using CCs with different TTI lengths.

The instructor may be configured to instruct the user device, at a predetermined timing, to switch between using the subframe of the first component carrier as the reference subframe and using the subframe of the second component carrier as the reference subframe. With this configuration, instead of continuously using one of the calculation method 1 and the calculation method 2, the user device UE can switch between the calculation method 1 and the calculation method 2 at an appropriate timing such as a timing when the communication status of a CC changes.

Another embodiment of the present invention provides a communication method performed by a user device for a radio communication system supporting uplink carrier aggregation. The communication method includes transmitting an uplink signal to a base station by using a first component carrier and a second component carrier having a TTI length shorter than a TTI length of the first component carrier, and calculating a lower limit and an upper limit of a maximum transmission power of the uplink signal according to predetermined formulas using one of a subframe of the first component carrier and a subframe of the second component carrier as a reference subframe. This communication method provides a technology that makes it possible to properly calculate the lower limit and the upper limit of the maximum transmission power for communications where CA is performed using CCs with different TTI lengths.

Another embodiment of the present invention provides an instruction method performed by a base station for a radio communication system supporting uplink carrier aggregation. The instruction method includes receiving an uplink signal from a user device, and instructing the user device whether to calculate a lower limit and an upper limit of a maximum transmission power of the uplink signal according to predetermined formulas using a subframe of a first component carrier as a reference subframe or to calculate the lower limit and the upper limit of the maximum transmission power of the uplink signal according to the predetermined formulas using a subframe of a second component carrier as the reference subframe, the second component carrier having a TTI length shorter than a TTI length of the first component carrier. This instruction method provides a technology that makes it possible to properly calculate the lower limit and the upper limit of the maximum transmission power for communications where CA is performed using CCs with different TTI lengths.

<Supplementary Description of Embodiments>

Each signal may be a message. For example, the instruction signal may be an instruction message, and the report signal may be a report message.

The order of steps described in each method claim is an example, and the steps may be performed in any other order unless otherwise mentioned.

Components of each apparatus (the user device UE, the base station eNB) described in the above embodiments may be implemented by executing a program stored in a memory by a CPU (processor) of the apparatus, may be implemented by hardware such as hardware circuits including logic for the above-described processes, or may be implemented by a combination of programs and hardware.

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. The order of steps in sequence charts and flowcharts described in the embodiments may be changed unless they do not become inconsistent. Although functional block diagrams are used to describe the user device UE and the base station eNB, the user device UE and the base station eNB may be implemented by hardware, software, or a combination of them. Software to be executed by a processor of the user device UE and software to be executed by a processor of the base station eNB according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server.

In the embodiments, $P_{CMAX\_L}$ is an example of a lower limit of maximum transmission power, and $P_{CMAX\_H}$ is an example of an upper limit of maximum transmission power.

The present application is based on and claims the benefit of priority of Japanese Patent Application No. 2015-164257 filed on Aug. 21, 2015, the entire contents of which are hereby incorporated herein by reference.

EXPLANATION OF REFERENCE NUMERALS eNB Base station
UE User device
101 Signal transmitter
102 Signal receiver
103 Calculator
201 Signal transmitter
202 Signal receiver
203 Instructor
301 RF module
302 BB processing module
303 UE control module
401 RF module
402 BB processing module
403 Device control module
404 Communication IF

The invention claimed is:

1. A user device for a radio communication system supporting uplink dual connectivity, the user device comprising:
a transmitter that transmits an uplink signal to a base station by using a first component carrier and a second component carrier having a time length shorter than a Transmission Time Interval (TTI) length of the first component carrier; and
a processor that calculates a lower limit and an upper limit of a maximum transmission power of the uplink signal according to predetermined formulas using a subframe of the first component carrier as a reference subframe,
wherein the processor further
combines the subframe of the first component carrier with respective periods of the second component carrier that overlap the subframe of the first component carrier between a start point and an end point of the subframe of the first component carrier,
calculates the lower limit of the maximum transmission power using one of the combinations whose lower limit of the maximum transmission power is smallest, and
calculates the upper limit of the maximum transmission power using one of the combinations whose upper limit of the maximum transmission power is largest.

2. The user device according to claim 1, wherein the first component carrier is a Long Term Evolution (LTE) component carrier, and the second component carrier is fifth-generation (5G) component carrier.

3. The user device as claimed in claim 1, wherein the periods of the second component carrier cross at least one of the start point and the end point of the subframe of the first component carrier.

4. A communication method performed by a user device for a radio communication system supporting uplink dual connectivity, the communication method comprising:
transmitting an uplink signal to a base station by using a first component carrier and a second component carrier having a time length shorter than a Transmission Time Interval (TTI) length of the first component carrier; and
calculating a lower limit and an upper limit of a maximum transmission power of the uplink signal according to predetermined formulas using a subframe of the first component carrier as a reference subframe,
wherein the user device
combines the subframe of the first component carrier with respective periods of the second component carrier that overlap the subframe of the first component carrier between a start point and an end point of the subframe of the first component carrier,
calculates the lower limit of the maximum transmission power using one of the combinations whose lower limit of the maximum transmission power is smallest, and
calculates the upper limit of the maximum transmission power using one of the combinations whose upper limit of the maximum transmission power is largest.

5. A base station for a radio communication system supporting uplink dual connectivity, the base station comprising:
a receiver that receives an uplink signal from a user device; and
an instructor that instructs the user device whether to calculate a lower limit and an upper limit of a maximum transmission power of the uplink signal according to predetermined formulas using a subframe of a first component carrier as a reference subframe or to calculate the lower limit and the upper limit of the maximum transmission power of the uplink signal according to the predetermined formulas using a subframe of a second component carrier as the reference subframe, the second component carrier having a time length shorter than a Transmission Time Interval (TTI) length of the first component carrier,
wherein in a case where the lower limit and the upper limit of the maximum transmission power of the uplink signal are calculated according to the predetermined formulas using the subframe of the first component carrier as the reference subframe, the instructor instructs the user device to
combine the subframe of the first component carrier with respective periods of the second component carrier that overlap the subframe of the first component carrier between a start point and an end point of the subframe of the first component carrier,
calculate the lower limit of the maximum transmission power using one of the combinations whose lower limit of the maximum transmission power is smallest, and
calculate the upper limit of the maximum transmission power using one of the combinations whose upper limit of the maximum transmission power is largest.

6. An instruction method performed by a base station for a radio communication system supporting uplink dual connectivity, the instruction method comprising:
receiving an uplink signal from a user device; and instructing the user device whether to calculate a lower limit and an upper limit of a maximum transmission power of the uplink signal according to predetermined formulas using a subframe of a first component carrier as a reference subframe or to calculate the lower limit and the upper limit of the maximum transmission power of the uplink signal according to the predetermined formulas using a subframe of a second component carrier as the reference subframe, the second component carrier having a time length shorter than a Transmission Time Interval (TTI) length of the first component carrier, wherein in a case where the lower limit and the upper limit of the maximum transmission power of the uplink signal are calculated according to the predetermined formulas using the subframe of the first component carrier as the reference subframe, the base station instructs the user device to combine the subframe of the first component carrier with respective periods of the second component carrier that overlap the subframe of the first component carrier between a start point and an end point of the subframe of the first component carrier, calculate the lower limit of the maximum transmission power using one of the combinations whose lower limit of the maximum transmission power is smallest, and calculate the upper limit of the maximum transmission power using one of the combinations whose upper limit of the maximum transmission power is largest.

* * * * *